United States Patent
Robol et al.

(10) Patent No.: US 9,568,005 B2
(45) Date of Patent: Feb. 14, 2017

(54) DISCHARGE VACUUM RELIEF VALVE FOR SAFETY VACUUM RELEASE SYSTEM

(71) Applicant: Pentair Water Pool and Spa, Inc., Sanford, NC (US)

(72) Inventors: Ronald B. Robol, Sanford, NC (US); Daniel J. Hruby, Sanford, NC (US); Johnathan Steven Colvin, Cameron, NC (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 0 days.

(21) Appl. No.: 14/974,206

(22) Filed: Dec. 18, 2015

(65) Prior Publication Data

US 2016/0138727 A1    May 19, 2016

Related U.S. Application Data

(62) Division of application No. 13/314,798, filed on Dec. 8, 2011, now Pat. No. 9,243,413.

(Continued)

(51) Int. Cl.
*F04D 15/00* (2006.01)
*F16K 15/06* (2006.01)
(Continued)

(52) U.S. Cl.
CPC .......... *F04D 15/0083* (2013.01); *E04H 4/1245* (2013.01); *E04H 4/1645* (2013.01);
(Continued)

(58) Field of Classification Search
CPC ................. Y10T 137/7897; Y10T 137/2569; Y10T 137/86027; F16K 15/063; C02F 2301/063; E04H 4/1645; E04H 4/1245; F04D 15/0218; F04D 15/0077; F04D 15/0083
See application file for complete search history.

(56) References Cited

U.S. PATENT DOCUMENTS

| 981,213 A | 1/1911 | Mollitor |
|---|---|---|
| 1,993,267 A | 3/1935 | Ferguson |

(Continued)

FOREIGN PATENT DOCUMENTS

| AU | 3940997 | 2/1998 |
|---|---|---|
| AU | 2005204246 A1 | 3/2006 |

(Continued)

OTHER PUBLICATIONS

9PX-42—Hayward Pool Systems; "Hayward EcoStar & EcoStar SVRS Variable Speed Pumps Brochure;" Civil Action 5:11-cv-00459D; 2010.

(Continued)

*Primary Examiner* — Atif Chaudry
(74) *Attorney, Agent, or Firm* — Quarles & Brady LLP

(57) ABSTRACT

A discharge vacuum relief valve kit to provide vacuum relief for a SVRS pump in a hydraulic system is provided. The discharge vacuum relief valve kit includes a vacuum vent tube including a first end and a second end, a discharge vacuum relief valve coupled to the first end of the vacuum vent tube, and a vacuum vent screen coupled to the second end of the vacuum vent tube. The discharge vacuum relief valve is coupled to a drain plug opening of the SVRS pump.

18 Claims, 6 Drawing Sheets

Related U.S. Application Data

(60) Provisional application No. 61/421,069, filed on Dec. 8, 2010.

(51) Int. Cl.
*F04D 15/02* (2006.01)
*F16K 17/04* (2006.01)
*E04H 4/16* (2006.01)
*E04H 4/12* (2006.01)
*F04B 53/06* (2006.01)
*F04B 53/10* (2006.01)
*F16K 24/04* (2006.01)

(52) U.S. Cl.
CPC .............. *F04B 53/06* (2013.01); *F04B 53/10* (2013.01); *F04D 15/0077* (2013.01); *F04D 15/0218* (2013.01); *F16K 15/063* (2013.01); *F16K 17/04* (2013.01); *F16K 24/04* (2013.01); *C02F 2301/063* (2013.01); *Y10T 137/0396* (2015.04); *Y10T 137/2569* (2015.04); *Y10T 137/7897* (2015.04); *Y10T 137/86027* (2015.04)

(56) References Cited

U.S. PATENT DOCUMENTS

| | | |
|---|---|---|
| 2,238,597 A | 4/1941 | Page |
| 2,458,006 A | 1/1949 | Kilgore |
| 2,488,365 A | 11/1949 | Abbott et al. |
| 2,494,200 A | 1/1950 | Ramqvist |
| 2,615,937 A | 10/1952 | Ludwig |
| 2,716,195 A | 8/1955 | Anderson |
| 2,767,277 A | 10/1956 | Wirth |
| 2,778,958 A | 1/1957 | Hamm et al. |
| 2,881,337 A | 4/1959 | Wall |
| 3,116,445 A | 12/1963 | Wright |
| 3,191,935 A | 6/1965 | Uecker |
| 3,204,423 A | 9/1965 | Resh, Jr. |
| 3,213,304 A | 10/1965 | Landerg et al. |
| 3,226,620 A | 12/1965 | Elliott et al. |
| 3,227,808 A | 1/1966 | Morris |
| 3,291,058 A | 12/1966 | McFarlin |
| 3,316,843 A | 5/1967 | Vaughan |
| 3,481,973 A | 12/1969 | Wygant |
| 3,530,348 A | 9/1970 | Connor |
| 3,558,910 A | 1/1971 | Dale et al. |
| 3,559,731 A | 2/1971 | Stafford |
| 3,562,614 A | 2/1971 | Gramkow |
| 3,566,225 A | 2/1971 | Paulson |
| 3,573,579 A | 4/1971 | Lewus |
| 3,581,895 A | 6/1971 | Howard et al. |
| 3,593,081 A | 7/1971 | Forst |
| 3,594,623 A | 7/1971 | LaMaster |
| 3,596,158 A | 7/1971 | Watrous |
| 3,613,805 A | 10/1971 | Lindstad |
| 3,624,470 A | 11/1971 | Johnson |
| 3,634,842 A | 1/1972 | Niedermeyer |
| 3,652,912 A | 3/1972 | Bordonaro |
| 3,671,830 A | 6/1972 | Kruger |
| 3,726,606 A | 4/1973 | Peters |
| 1,061,919 A | 5/1973 | Miller |
| 3,735,233 A | 5/1973 | Ringle |
| 3,737,749 A | 6/1973 | Schmit |
| 3,753,072 A | 8/1973 | Jurgens |
| 3,761,750 A | 9/1973 | Green |
| 3,761,792 A | 9/1973 | Whitney |
| 3,777,232 A | 12/1973 | Woods et al. |
| 3,778,804 A | 12/1973 | Adair |
| 3,780,759 A | 12/1973 | Yahle et al. |
| 3,781,925 A | 1/1974 | Curtis |
| 3,787,882 A | 1/1974 | Fillmore |
| 3,792,324 A | 2/1974 | Suarez |
| 3,800,205 A | 3/1974 | Zalar |
| 3,814,544 A | 6/1974 | Roberts et al. |
| 3,838,597 A | 10/1974 | Montgomery et al. |
| 3,867,071 A | 2/1975 | Hartley |
| 3,882,364 A | 5/1975 | Wright |
| 3,902,369 A | 9/1975 | Metz |
| 3,910,725 A | 10/1975 | Rule |
| 3,913,342 A | 10/1975 | Barry |
| 3,916,274 A | 10/1975 | Lewus |
| 3,941,507 A | 3/1976 | Niedermeyer |
| 3,949,782 A | 4/1976 | Athey et al. |
| 3,953,777 A | 4/1976 | McKee |
| 3,956,760 A | 5/1976 | Edwards |
| 3,963,375 A | 6/1976 | Curtis |
| 3,972,647 A | 8/1976 | Niedermeyer |
| 3,976,919 A | 8/1976 | Vandevier |
| 3,987,240 A | 10/1976 | Schultz |
| 4,000,446 A | 12/1976 | Vandevier |
| 4,021,700 A | 5/1977 | Ellis-Anwyl |
| 4,041,470 A | 8/1977 | Slane et al. |
| 4,061,442 A | 12/1977 | Clark et al. |
| 4,087,204 A | 5/1978 | Niedermeyer |
| 4,108,574 A | 8/1978 | Bartley et al. |
| 4,123,792 A | 10/1978 | Gephart et al. |
| 4,133,058 A | 1/1979 | Baker |
| 4,142,415 A | 3/1979 | Jung et al. |
| 4,151,080 A | 4/1979 | Zuckerman et al. |
| 4,168,413 A | 9/1979 | Halpine |
| 4,169,377 A | 10/1979 | Scheib |
| 4,182,363 A | 1/1980 | Fuller et al. |
| 4,185,187 A | 1/1980 | Rogers |
| 4,187,503 A | 2/1980 | Walton |
| 4,206,634 A | 6/1980 | Taylor |
| 4,215,975 A | 8/1980 | Niedermeyer |
| 4,222,711 A | 9/1980 | Mayer |
| 4,225,290 A | 9/1980 | Allington |
| 4,228,427 A | 10/1980 | Niedermeyer |
| 4,233,553 A | 11/1980 | Prince |
| 4,241,299 A | 12/1980 | Bertone |
| 4,255,747 A | 3/1981 | Bunia |
| 4,263,535 A | 4/1981 | Jones |
| 4,276,454 A | 6/1981 | Zathan |
| 4,286,303 A | 8/1981 | Genheimer et al. |
| 4,303,203 A | 12/1981 | Avery |
| 4,307,327 A | 12/1981 | Streater et al. |
| 4,309,157 A | 1/1982 | Niedermeyer |
| 4,314,478 A | 2/1982 | Beaman |
| 4,319,712 A | 3/1982 | Bar |
| 4,322,297 A | 3/1982 | Bajka |
| 4,330,412 A | 5/1982 | Frederick |
| 4,353,220 A | 10/1982 | Curwein |
| 4,366,426 A | 12/1982 | Turlej |
| 4,369,438 A | 1/1983 | Wilhelmi |
| 4,370,098 A | 1/1983 | McClain et al. |
| 4,370,690 A | 1/1983 | Baker |
| 4,371,315 A | 2/1983 | Shikasho |
| 4,375,613 A | 3/1983 | Fuller et al. |
| 4,384,825 A | 5/1983 | Thomas et al. |
| 4,399,394 A | 8/1983 | Ballman |
| 4,402,094 A | 9/1983 | Sanders |
| 4,409,532 A | 10/1983 | Hollenbeck |
| 4,419,625 A | 12/1983 | Bejot et al. |
| 4,420,787 A | 12/1983 | Tibbits et al. |
| 4,421,643 A | 12/1983 | Frederick |
| 4,425,836 A | 1/1984 | Pickrell |
| 4,427,545 A | 1/1984 | Arguilez |
| 4,428,434 A | 1/1984 | Gelaude |
| 4,429,343 A | 1/1984 | Freud |
| 4,437,133 A | 3/1984 | Rueckert |
| 4,448,072 A | 5/1984 | Tward |
| 4,449,260 A | 5/1984 | Whitaker |
| 4,453,118 A | 6/1984 | Phillips |
| 4,456,432 A | 6/1984 | Mannino |
| 4,462,758 A | 7/1984 | Speed |
| 4,463,304 A | 7/1984 | Miller |
| 4,468,604 A | 8/1984 | Zaderej |
| 4,470,092 A | 9/1984 | Lombardi |
| 4,473,338 A | 9/1984 | Garmong |
| 4,494,180 A | 1/1985 | Streater |
| 4,496,895 A | 1/1985 | Kawate et al. |
| 4,504,773 A | 3/1985 | Suzuki et al. |

(56) References Cited

U.S. PATENT DOCUMENTS

| | | | |
|---|---|---|---|
| 4,505,643 A | 3/1985 | Millis et al. |
| D278,529 S | 4/1985 | Hoogner |
| 4,514,989 A | 5/1985 | Mount |
| 4,520,303 A | 5/1985 | Ward |
| 4,529,359 A | 7/1985 | Sloan |
| 4,541,029 A | 9/1985 | Ohyama |
| 4,545,906 A | 10/1985 | Frederick |
| 4,552,512 A | 11/1985 | Gallup et al. |
| 4,564,041 A | 1/1986 | Kramer |
| 4,564,882 A | 1/1986 | Baxter |
| 4,581,900 A | 4/1986 | Lowe |
| 4,604,563 A | 8/1986 | Min |
| 4,605,888 A | 8/1986 | Kim |
| 4,610,605 A | 9/1986 | Hartley |
| 4,620,835 A | 11/1986 | Bell |
| 4,622,506 A | 11/1986 | Shemanske |
| 4,635,441 A | 1/1987 | Ebbing et al. |
| 4,647,825 A | 3/1987 | Profio et al. |
| 4,651,077 A | 3/1987 | Woyski |
| 4,652,802 A | 3/1987 | Johnston |
| 4,658,195 A | 4/1987 | Min |
| 4,658,203 A | 4/1987 | Freymuth |
| 4,668,902 A | 5/1987 | Zeller, Jr. |
| 4,670,697 A | 6/1987 | Wrege |
| 4,676,914 A | 6/1987 | Mills et al. |
| 4,678,404 A | 7/1987 | Lorett et al. |
| 4,678,409 A | 7/1987 | Kurokawa |
| 4,686,439 A | 8/1987 | Cunningham |
| 4,695,779 A | 9/1987 | Yates |
| 4,697,464 A | 10/1987 | Martin |
| 4,703,387 A | 10/1987 | Mller |
| 4,705,629 A | 11/1987 | Weir |
| 4,716,605 A | 1/1988 | Shepherd |
| 4,719,399 A | 1/1988 | Wrege |
| 4,728,882 A | 3/1988 | Stanbro |
| 4,751,449 A | 6/1988 | Chmiel |
| 4,751,450 A | 6/1988 | Lorenz |
| 4,758,697 A | 7/1988 | Jeuneu |
| 4,761,601 A | 8/1988 | Zaderej |
| 4,764,417 A | 8/1988 | Gulya |
| 4,764,714 A | 8/1988 | Alley |
| 4,766,329 A | 8/1988 | Santiago |
| 4,767,280 A | 8/1988 | Markuson |
| 4,780,050 A | 10/1988 | Caine et al. |
| 4,781,525 A | 11/1988 | Hubbard |
| 4,782,278 A | 11/1988 | Bossi |
| 4,786,850 A | 11/1988 | Chmiel |
| 4,789,307 A | 12/1988 | Sloan |
| 4,795,314 A | 1/1989 | Prybella et al. |
| 4,801,858 A | 1/1989 | Min |
| 4,804,901 A | 2/1989 | Pertessis |
| 4,806,457 A | 2/1989 | Yanagisawa |
| 4,820,964 A | 4/1989 | Kadah |
| 4,827,197 A | 5/1989 | Giebler |
| 4,834,624 A | 5/1989 | Jensen |
| 4,837,656 A | 6/1989 | Barnes |
| 4,839,571 A | 6/1989 | Farnham |
| 4,841,404 A | 6/1989 | Marshall et al. |
| 4,843,295 A | 6/1989 | Thompson |
| 4,862,053 A | 8/1989 | Jordan |
| 4,864,287 A | 9/1989 | Kierstead |
| 4,885,655 A | 12/1989 | Springer et al. |
| 4,891,569 A | 1/1990 | Light |
| 4,896,101 A | 1/1990 | Cobb |
| 4,907,610 A | 3/1990 | Meincke |
| 4,912,936 A | 4/1990 | Denpou |
| 4,913,625 A | 4/1990 | Gerlowski |
| 4,949,748 A | 8/1990 | Chatrathi |
| 4,958,118 A | 9/1990 | Pottebaum |
| 4,963,778 A | 10/1990 | Jensen |
| 4,967,131 A | 10/1990 | Kim |
| 4,971,522 A | 11/1990 | Butlin |
| 4,975,798 A | 12/1990 | Edwards et al. |
| 4,977,394 A | 12/1990 | Manson et al. |
| 4,985,181 A | 1/1991 | Strada et al. |
| 4,986,919 A | 1/1991 | Allington |
| 4,996,646 A | 2/1991 | Farrington |
| D315,315 S | 3/1991 | Stairs, Jr. |
| 4,998,097 A | 3/1991 | Noth et al. |
| 5,015,151 A | 5/1991 | Snyder, Jr. et al. |
| 5,015,152 A | 5/1991 | Greene |
| 5,017,853 A | 5/1991 | Chmiel |
| 5,026,256 A | 6/1991 | Kuwabara |
| 5,041,771 A | 8/1991 | Min |
| 5,051,068 A | 9/1991 | Wong |
| 5,051,681 A | 9/1991 | Schwarz |
| 5,076,761 A | 12/1991 | Krohn |
| 5,076,763 A | 12/1991 | Anastos et al. |
| 5,079,784 A | 1/1992 | Rist et al. |
| 5,091,817 A | 2/1992 | Alley |
| 5,098,023 A | 3/1992 | Burke |
| 5,099,181 A | 3/1992 | Canon |
| 5,100,298 A | 3/1992 | Shibata |
| RE33,874 E | 4/1992 | Miller |
| 5,103,154 A | 4/1992 | Dropps |
| 5,117,233 A | 5/1992 | Hamos et al. |
| 5,123,080 A | 6/1992 | Gillett |
| 5,129,264 A | 7/1992 | Lorenc |
| 5,135,359 A | 8/1992 | Dufresne |
| 5,145,323 A | 9/1992 | Farr |
| 5,151,017 A | 9/1992 | Sears et al. |
| 5,154,821 A | 10/1992 | Reid |
| 5,156,535 A | 10/1992 | Budris |
| 5,158,436 A | 10/1992 | Jensen |
| 5,159,713 A | 10/1992 | Gaskell |
| 5,164,651 A | 11/1992 | Hu |
| 5,166,595 A | 11/1992 | Leverich |
| 5,167,041 A | 12/1992 | Burkitt |
| 5,172,089 A | 12/1992 | Wright et al. |
| D334,542 S | 4/1993 | Lowe |
| 5,206,573 A | 4/1993 | McCleer et al. |
| 5,222,867 A | 6/1993 | Walker, Sr. et al. |
| 5,234,286 A | 8/1993 | Wagner |
| 5,234,319 A | 8/1993 | Wilder |
| 5,235,235 A | 8/1993 | Martin |
| 5,238,369 A | 8/1993 | Farr |
| 5,240,380 A | 8/1993 | Mabe |
| 5,245,272 A | 9/1993 | Herbert |
| 5,247,236 A | 9/1993 | Schroeder |
| 5,255,148 A | 10/1993 | Yeh |
| 5,272,933 A | 12/1993 | Collier |
| 5,295,790 A | 3/1994 | Bossart et al. |
| 5,295,857 A | 3/1994 | Toly |
| 5,296,795 A | 3/1994 | Dropps |
| 5,302,885 A | 4/1994 | Schwarz |
| 5,319,298 A | 6/1994 | Wanzong et al. |
| 5,324,170 A | 6/1994 | Anastos et al. |
| 5,327,036 A | 7/1994 | Carey |
| 5,342,176 A | 8/1994 | Redlich |
| 5,347,664 A | 9/1994 | Hamza et al. |
| 5,349,281 A | 9/1994 | Bugaj |
| 5,351,709 A | 10/1994 | Vos |
| 5,351,714 A | 10/1994 | Barnowski |
| 5,352,969 A | 10/1994 | Gilmore et al. |
| 5,361,215 A | 11/1994 | Tompkins |
| 5,363,912 A | 11/1994 | Wolcott |
| 5,394,748 A | 3/1995 | McCarthy |
| 5,418,984 A | 5/1995 | Livingston, Jr. |
| D359,458 S | 6/1995 | Pierret |
| 5,422,014 A | 6/1995 | Allen et al. |
| 5,423,214 A | 6/1995 | Lee |
| 5,425,624 A | 6/1995 | Williams |
| 5,443,368 A | 8/1995 | Weeks et al. |
| 5,444,354 A | 8/1995 | Takahashi |
| 5,449,274 A | 9/1995 | Kochan, Jr. |
| 5,449,997 A | 9/1995 | Gilmore et al. |
| 5,450,316 A | 9/1995 | Gaudet et al. |
| D363,060 S | 10/1995 | Hunger |
| 5,457,373 A | 10/1995 | Heppe et al. |
| 5,471,125 A | 11/1995 | Wu |
| 5,473,497 A | 12/1995 | Beatty |
| 5,483,229 A | 1/1996 | Tamura et al. |
| 5,495,161 A | 2/1996 | Hunter |
| 5,499,902 A | 3/1996 | Rockwood |

(56) References Cited

U.S. PATENT DOCUMENTS

| | | |
|---|---|---|
| 5,511,397 A | 4/1996 | Makino et al. |
| 5,512,809 A | 4/1996 | Banks et al. |
| 5,512,883 A | 4/1996 | Lane |
| 5,518,371 A | 5/1996 | Wellstein |
| 5,519,848 A | 5/1996 | Wloka |
| 5,520,517 A | 5/1996 | Sipin |
| 5,522,707 A | 6/1996 | Potter |
| 5,528,120 A | 6/1996 | Brodetsky |
| 5,529,462 A | 6/1996 | Hawes |
| 5,532,635 A | 7/1996 | Watrous |
| 5,540,555 A | 7/1996 | Corso et al. |
| D372,719 S | 8/1996 | Jensen |
| 5,545,012 A | 8/1996 | Anastos et al. |
| 5,548,854 A | 8/1996 | Bloemer et al. |
| 5,549,456 A | 8/1996 | Burrill |
| 5,550,497 A | 8/1996 | Carobolante |
| 5,550,753 A | 8/1996 | Tompkins et al. |
| 5,559,418 A | 9/1996 | Burkhart |
| 5,559,720 A | 9/1996 | Tompkins |
| 5,559,762 A | 9/1996 | Sakamoto |
| 5,561,357 A | 10/1996 | Schroeder |
| 5,562,422 A | 10/1996 | Ganzon et al. |
| 5,563,759 A | 10/1996 | Nadd |
| D375,908 S | 11/1996 | Schumaker |
| 5,570,481 A | 11/1996 | Mathis et al. |
| 5,571,000 A | 11/1996 | Zimmerman |
| 5,577,890 A | 11/1996 | Nielson et al. |
| 5,580,221 A | 12/1996 | Triezenberg |
| 5,582,017 A | 12/1996 | Noji et al. |
| 5,589,753 A | 12/1996 | Kadah |
| 5,592,062 A | 1/1997 | Bach |
| 5,598,080 A | 1/1997 | Jensen |
| 5,601,413 A | 2/1997 | Langley |
| 5,604,491 A | 2/1997 | Coonley et al. |
| 5,614,812 A | 3/1997 | Wagoner |
| 5,616,239 A | 4/1997 | Wandell et al. |
| 5,618,460 A | 4/1997 | Fowler |
| 5,622,223 A | 4/1997 | Vasquez |
| 5,624,237 A | 4/1997 | Prescott et al. |
| 5,626,464 A | 5/1997 | Schoenmeyr |
| 5,628,896 A | 5/1997 | Klingenberger |
| 5,629,601 A | 5/1997 | Feldstein |
| 5,632,468 A | 5/1997 | Schoenmeyr |
| 5,633,540 A | 5/1997 | Moan |
| 5,640,078 A | 6/1997 | Kou et al. |
| 5,654,504 A | 8/1997 | Smith et al. |
| 5,654,620 A | 8/1997 | Langhorst |
| 5,669,323 A | 9/1997 | Pritchard |
| 5,672,050 A | 9/1997 | Webber et al. |
| 5,682,624 A | 11/1997 | Ciochetti |
| 5,690,476 A | 11/1997 | Miller |
| 5,708,348 A | 1/1998 | Frey et al. |
| 5,711,483 A | 1/1998 | Hays |
| 5,712,795 A | 1/1998 | Layman et al. |
| 5,713,320 A | 2/1998 | Pfaff et al. |
| 5,727,933 A | 3/1998 | Laskaris et al. |
| 5,730,861 A | 3/1998 | Sterghos |
| 5,731,673 A | 3/1998 | Gilmore |
| 5,736,884 A | 4/1998 | Ettes et al. |
| 5,739,648 A | 4/1998 | Ellis et al. |
| 5,744,921 A | 4/1998 | Makaran |
| 5,754,036 A | 5/1998 | Walker |
| 5,754,421 A | 5/1998 | Nystrom |
| 5,767,606 A | 6/1998 | Bresolin |
| 5,775,592 A * | 7/1998 | Goldsmith ........... A01C 23/042 |
| | | 137/891 |
| 5,777,833 A | 7/1998 | Romillon |
| 5,780,992 A | 7/1998 | Beard |
| 5,791,882 A | 8/1998 | Stucker |
| 5,796,234 A | 8/1998 | Vrionis |
| 5,802,910 A | 9/1998 | Krahn et al. |
| 5,804,080 A | 9/1998 | Klingenberger |
| 5,808,441 A | 9/1998 | Nehring |
| 5,814,966 A | 9/1998 | Williamson |
| 5,818,708 A | 10/1998 | Wong |
| 5,818,714 A | 10/1998 | Zou |
| 5,819,848 A | 10/1998 | Ramusson |
| 5,820,350 A | 10/1998 | Mantey et al. |
| 5,828,200 A | 10/1998 | Ligman et al. |
| 5,833,437 A | 11/1998 | Kurth et al. |
| 5,836,271 A | 11/1998 | Saski |
| 5,845,225 A | 12/1998 | Mosher |
| 5,856,783 A | 1/1999 | Gibb |
| 5,863,185 A | 1/1999 | Cochimin et al. |
| 5,883,489 A | 3/1999 | Konrad |
| 5,892,349 A | 4/1999 | Bogwicz |
| 5,894,609 A | 4/1999 | Barnett |
| 5,898,958 A | 5/1999 | Hall |
| 5,906,479 A | 5/1999 | Hawes |
| 5,907,281 A | 5/1999 | Miller, Jr. et al. |
| 5,909,352 A | 6/1999 | Klabunde et al. |
| 5,909,372 A | 6/1999 | Thybo |
| 5,914,881 A | 6/1999 | Trachier |
| 5,920,264 A | 7/1999 | Kim et al. |
| 5,930,092 A | 7/1999 | Nystrom |
| 5,941,690 A | 8/1999 | Lin |
| 5,944,444 A | 8/1999 | Motz et al. |
| 5,945,802 A | 8/1999 | Konrad |
| 5,946,469 A | 8/1999 | Chidester |
| 5,947,689 A | 9/1999 | Schick |
| 5,947,700 A | 9/1999 | McKain et al. |
| 5,959,534 A | 9/1999 | Campbell |
| 5,961,291 A | 10/1999 | Sakagami et al. |
| 5,969,958 A | 10/1999 | Nielsen |
| 5,973,465 A | 10/1999 | Rayner |
| 5,973,473 A | 10/1999 | Anderson |
| 5,977,732 A | 11/1999 | Matsumoto |
| 5,983,146 A | 11/1999 | Sarbach |
| 5,986,433 A | 11/1999 | Peele et al. |
| 5,987,105 A | 11/1999 | Jenkins et al. |
| 5,991,939 A | 11/1999 | Mulvey |
| 6,030,180 A | 2/2000 | Clarey et al. |
| 6,037,742 A | 3/2000 | Rasmussen |
| 6,043,461 A | 3/2000 | Holling et al. |
| 6,045,331 A | 4/2000 | Gehm et al. |
| 6,045,333 A | 4/2000 | Breit |
| 6,046,492 A | 4/2000 | Machida |
| 6,048,183 A | 4/2000 | Meza |
| 6,056,008 A | 5/2000 | Adams et al. |
| 6,059,536 A | 5/2000 | Stingl |
| 6,065,946 A | 5/2000 | Lathrop |
| 6,072,291 A | 6/2000 | Pedersen |
| 6,081,751 A | 6/2000 | Luo |
| 6,091,604 A | 7/2000 | Plougsgaard |
| 6,092,992 A | 7/2000 | Imblum |
| D429,699 S | 8/2000 | Davis |
| D429,700 S | 8/2000 | Liebig |
| 6,094,764 A | 8/2000 | Veloskey et al. |
| 6,098,654 A | 8/2000 | Cohen et al. |
| 6,102,665 A | 8/2000 | Centers et al. |
| 6,110,322 A | 8/2000 | Teoh et al. |
| 6,116,040 A | 9/2000 | Stark |
| 6,121,746 A | 9/2000 | Fishers |
| 6,121,749 A | 9/2000 | Wills et al. |
| 6,125,481 A | 10/2000 | Sicilano |
| 6,125,883 A | 10/2000 | Creps et al. |
| 6,142,741 A | 11/2000 | Nishihata |
| 6,146,108 A | 11/2000 | Mullendore |
| 6,150,776 A | 11/2000 | Potter et al. |
| 6,157,304 A | 12/2000 | Bennett et al. |
| 6,164,132 A | 12/2000 | Matulek |
| 6,171,073 B1 | 1/2001 | McKain et al. |
| 6,178,393 B1 | 1/2001 | Irvin |
| 6,184,650 B1 | 2/2001 | Gelbman |
| 6,188,200 B1 | 2/2001 | Maiorano |
| 6,198,257 B1 | 3/2001 | Belehradek et al. |
| 6,199,224 B1 | 3/2001 | Versland |
| 6,203,282 B1 | 3/2001 | Morin |
| 6,208,112 B1 | 3/2001 | Jensen et al. |
| 6,212,956 B1 | 4/2001 | Donald |
| 6,213,724 B1 | 4/2001 | Haugen |
| 6,216,814 B1 | 4/2001 | Fujita et al. |
| 6,222,355 B1 | 4/2001 | Ohshima |
| 6,227,808 B1 | 5/2001 | McDonough |

(56) References Cited

U.S. PATENT DOCUMENTS

| | | |
|---|---|---|
| 6,232,742 B1 | 5/2001 | Wachnov |
| 6,236,177 B1 | 5/2001 | Zick |
| 6,238,188 B1 | 5/2001 | Lifson |
| 6,247,429 B1 | 6/2001 | Hara |
| 6,249,435 B1 | 6/2001 | Vicente et al. |
| 6,251,285 B1 | 6/2001 | Clochetti |
| 6,253,227 B1 | 6/2001 | Tompkins et al. |
| D445,405 S | 7/2001 | Schneider |
| 6,254,353 B1 | 7/2001 | Polo |
| 6,257,304 B1 | 7/2001 | Jacobs et al. |
| 6,257,833 B1 | 7/2001 | Bates |
| 6,259,617 B1 | 7/2001 | Wu |
| 6,264,431 B1 | 7/2001 | Trizenberg |
| 6,264,432 B1 | 7/2001 | Kilayko et al. |
| 6,280,611 B1 | 8/2001 | Henkin et al. |
| 6,282,370 B1 | 8/2001 | Cline et al. |
| 6,298,721 B1 | 10/2001 | Schuppe et al. |
| 6,299,414 B1 | 10/2001 | Schoenmeyr |
| 6,299,699 B1 | 10/2001 | Porat et al. |
| 6,318,093 B2 | 11/2001 | Gaudet et al. |
| 6,320,348 B1 | 11/2001 | Kadah |
| 6,326,752 B1 | 12/2001 | Jensen et al. |
| 6,329,784 B1 | 12/2001 | Puppin |
| 6,330,525 B1 | 12/2001 | Hays |
| 6,342,841 B1 | 1/2002 | Stingl |
| 6,349,268 B1 | 2/2002 | Ketonen et al. |
| 6,350,105 B1 | 2/2002 | Kobayashi et al. |
| 6,351,359 B1 | 2/2002 | Jager |
| 6,354,805 B1 | 3/2002 | Moeller |
| 6,356,464 B1 | 3/2002 | Balakrishnan |
| 6,356,853 B1 | 3/2002 | Sullivan |
| 6,362,591 B1 | 3/2002 | Moberg |
| 6,364,620 B1 | 4/2002 | Fletcher et al. |
| 6,364,621 B1 | 4/2002 | Yamauchi |
| 6,366,053 B1 | 4/2002 | Belehradek |
| 6,366,481 B1 | 4/2002 | Balakrishnan |
| 6,369,463 B1 | 4/2002 | Maiorano |
| 6,373,204 B1 | 4/2002 | Peterson |
| 6,373,728 B1 | 4/2002 | Aarestrup |
| 6,374,854 B1 | 4/2002 | Acosta |
| 6,375,430 B1 | 4/2002 | Eckert et al. |
| 6,380,707 B1 | 4/2002 | Rosholm |
| 6,388,642 B1 | 5/2002 | Cotis |
| 6,390,781 B1 | 5/2002 | McDonough |
| 6,406,265 B1 | 6/2002 | Hahn |
| 6,411,481 B1 | 6/2002 | Seubert |
| 6,415,808 B2 | 7/2002 | Joshi |
| 6,416,295 B1 | 7/2002 | Nagai |
| 6,426,633 B1 | 7/2002 | Thybo |
| 6,443,715 B1 | 9/2002 | Mayleben et al. |
| 6,445,565 B1 | 9/2002 | Toyoda et al. |
| 6,447,446 B1 | 9/2002 | Smith et al. |
| 6,448,713 B1 | 9/2002 | Farkas et al. |
| 6,450,771 B1 | 9/2002 | Centers |
| 6,462,971 B1 | 10/2002 | Balakrishnan et al. |
| 6,464,464 B2 | 10/2002 | Sabini |
| 6,468,042 B2 | 10/2002 | Moller |
| 6,468,052 B2 | 10/2002 | McKain et al. |
| 6,474,949 B1 | 11/2002 | Arai |
| 6,481,973 B1 | 11/2002 | Struthers |
| 6,483,278 B2 | 11/2002 | Harvest |
| 6,483,378 B2 | 11/2002 | Blodgett |
| 6,490,920 B1 | 12/2002 | Netzer |
| 6,493,227 B2 | 12/2002 | Nielson et al. |
| 6,496,392 B2 | 12/2002 | Odel |
| 6,499,961 B1 | 12/2002 | Wyatt |
| 6,501,629 B1 | 12/2002 | Mariott |
| 6,503,063 B1 | 1/2003 | Brunsell |
| 6,504,338 B1 | 1/2003 | Eichorn |
| 6,520,010 B1 | 2/2003 | Bergveld |
| 6,522,034 B1 | 2/2003 | Nakayama |
| 6,523,091 B2 | 2/2003 | Tirumala |
| 6,527,518 B2 | 3/2003 | Ostrowski |
| 6,534,940 B2 | 3/2003 | Bell et al. |
| 6,534,947 B2 | 3/2003 | Johnson |
| 6,537,032 B1 | 3/2003 | Horiuchi |
| 6,538,908 B2 | 3/2003 | Balakrishnan et al. |
| 6,539,797 B2 | 4/2003 | Livingston |
| 6,543,940 B2 | 4/2003 | Chu |
| 6,548,976 B2 | 4/2003 | Jensen |
| 6,564,627 B1 | 5/2003 | Sabini |
| 6,570,778 B2 | 5/2003 | Lipo et al. |
| 6,571,807 B2 | 6/2003 | Jones |
| 6,590,188 B2 | 7/2003 | Cline |
| 6,591,697 B2 | 7/2003 | Henyan |
| 6,591,863 B2 | 7/2003 | Ruschell |
| 6,595,051 B1 | 7/2003 | Chandler, Jr. |
| 6,595,762 B2 | 7/2003 | Khanwilkar et al. |
| 6,604,909 B2 | 8/2003 | Schoenmeyr |
| 6,607,360 B2 | 8/2003 | Fong |
| 6,616,413 B2 | 9/2003 | Humphries |
| 6,623,245 B2 | 9/2003 | Meza et al. |
| 6,626,840 B2 | 9/2003 | Drzewiecki |
| 6,628,501 B2 | 9/2003 | Toyoda |
| 6,632,072 B2 | 10/2003 | Lipscomb et al. |
| 6,636,135 B1 | 10/2003 | Vetter |
| 6,638,023 B2 | 10/2003 | Scott |
| D482,664 S | 11/2003 | Hunt |
| 6,643,153 B2 | 11/2003 | Balakrishnan |
| 6,651,900 B1 | 11/2003 | Yoshida |
| 6,663,349 B1 | 12/2003 | Discenzo et al. |
| 6,665,200 B2 | 12/2003 | Goto |
| 6,672,147 B1 | 1/2004 | Mazet |
| 6,675,912 B2 | 1/2004 | Carrier |
| 6,676,382 B2 | 1/2004 | Leighton et al. |
| 6,676,831 B2 | 1/2004 | Wolfe |
| 6,687,141 B2 | 2/2004 | Odell |
| 6,687,923 B2 | 2/2004 | Dick |
| 6,690,250 B2 | 2/2004 | Moller |
| 6,696,676 B1 | 2/2004 | Graves et al. |
| 6,700,333 B1 | 3/2004 | Hirshi et al. |
| 6,709,240 B1 | 3/2004 | Schmalz |
| 6,709,241 B2 | 3/2004 | Sabini |
| 6,709,575 B1 | 3/2004 | Verdegan |
| 6,715,996 B2 | 4/2004 | Moeller |
| 6,717,318 B1 | 4/2004 | Mathiasssen |
| 6,732,387 B1 | 5/2004 | Waldron |
| 6,737,905 B1 | 5/2004 | Noda |
| D490,726 S | 6/2004 | Eungprabhanth |
| 6,742,387 B2 | 6/2004 | Hamamoto |
| 6,747,367 B2 | 6/2004 | Cline et al. |
| 6,761,067 B1 | 7/2004 | Capano |
| 6,768,279 B1 | 7/2004 | Skinner |
| 6,770,043 B1 | 8/2004 | Kahn |
| 6,774,664 B2 | 8/2004 | Godbersen |
| 6,776,038 B1 | 8/2004 | Horton et al. |
| 6,776,584 B2 | 8/2004 | Sabini et al. |
| 6,778,868 B2 | 8/2004 | Imamura et al. |
| 6,779,205 B2 | 8/2004 | Mulvey |
| 6,782,309 B2 | 8/2004 | Laflamme |
| 6,783,328 B2 | 8/2004 | Lucke |
| 6,789,024 B1 | 9/2004 | Kochan, Jr. et al. |
| 6,794,921 B2 | 9/2004 | Abe |
| 6,797,164 B2 | 9/2004 | Leaverton |
| 6,798,271 B2 | 9/2004 | Swize |
| 6,799,950 B2 | 10/2004 | Meier et al. |
| 6,806,677 B2 | 10/2004 | Kelly et al. |
| 6,833,072 B1 * | 12/2004 | Krestine ............. B01D 35/027 210/416.1 |
| 6,837,688 B2 | 1/2005 | Kimberlin et al. |
| 6,842,117 B2 | 1/2005 | Keown |
| 6,847,130 B1 | 1/2005 | Belehradek et al. |
| 6,847,854 B2 | 1/2005 | Discenzo |
| 6,854,479 B2 | 2/2005 | Harwood |
| 6,863,502 B2 | 3/2005 | Bishop et al. |
| 6,867,383 B1 | 3/2005 | Currier |
| 6,875,961 B1 | 4/2005 | Collins |
| 6,882,165 B2 | 4/2005 | Ogura |
| 6,884,022 B2 | 4/2005 | Albright |
| D504,900 S | 5/2005 | Wang |
| D505,429 S | 5/2005 | Wang |
| 6,888,537 B2 | 5/2005 | Benson et al. |
| 6,895,608 B2 | 5/2005 | Goettl |
| 6,900,736 B2 | 5/2005 | Crumb |

(56) References Cited

U.S. PATENT DOCUMENTS

| | | |
|---|---|---|
| 6,906,482 B2 | 6/2005 | Shimizu |
| D507,243 S | 7/2005 | Miller |
| 6,914,793 B2 | 7/2005 | Balakrishnan |
| 6,922,348 B2 | 7/2005 | Nakajima |
| 6,925,823 B2 | 8/2005 | Lifson |
| 6,933,693 B2 | 8/2005 | Schuchmann |
| 6,941,785 B2 | 9/2005 | Haynes et al. |
| 6,943,325 B2 | 9/2005 | Pittman |
| D511,530 S | 11/2005 | Wang |
| D512,026 S | 11/2005 | Nurmi |
| 6,965,815 B1 | 11/2005 | Tompkins et al. |
| 6,966,967 B2 | 11/2005 | Curry |
| D512,440 S | 12/2005 | Wang |
| 6,973,794 B2 | 12/2005 | Street |
| 6,973,974 B2 | 12/2005 | McLoughlin et al. |
| 6,976,052 B2 | 12/2005 | Tompkins et al. |
| D513,737 S | 1/2006 | Riley |
| 6,981,399 B1 | 1/2006 | Nybo et al. |
| 6,981,402 B2 | 1/2006 | Bristol |
| 6,984,158 B2 | 1/2006 | Satoh |
| 6,989,649 B2 | 1/2006 | Mehlhorn |
| 6,993,414 B2 | 1/2006 | Shah |
| 6,998,807 B2 | 2/2006 | Phillips |
| 6,998,977 B2 | 2/2006 | Gregori et al. |
| 7,005,818 B2 | 2/2006 | Jensen |
| 7,012,394 B2 | 3/2006 | Moore et al. |
| 7,015,599 B2 | 3/2006 | Gull et al. |
| 7,040,107 B2 | 5/2006 | Lee et al. |
| 7,042,192 B2 | 5/2006 | Mehlhorn |
| 7,050,278 B2 | 5/2006 | Poulsen |
| 7,055,189 B2 | 6/2006 | Goettl |
| 7,070,134 B1 | 7/2006 | Hoyer |
| 7,077,781 B2 | 7/2006 | Ishikawa |
| 7,080,508 B2 | 7/2006 | Stavale |
| 7,081,728 B2 | 7/2006 | Kemp |
| 7,083,392 B2 | 8/2006 | Meza et al. |
| 7,089,607 B2 | 8/2006 | Barnes et al. |
| 7,100,632 B2 | 9/2006 | Harwood |
| 7,102,505 B2 | 9/2006 | Kates |
| 7,112,037 B2 | 9/2006 | Sabini et al. |
| 7,114,926 B2 | 10/2006 | Oshita |
| 7,117,120 B2 | 10/2006 | Beck et al. |
| 7,141,210 B2 | 11/2006 | Bell |
| 7,142,932 B2 | 11/2006 | Spria et al. |
| D533,512 S | 12/2006 | Nakashima |
| 7,163,380 B2 | 1/2007 | Jones |
| 7,172,366 B1 | 2/2007 | Bishop, Jr. |
| 7,178,179 B2 | 2/2007 | Barnes |
| 7,183,741 B2 | 2/2007 | Mehlhorn |
| 7,195,462 B2 | 3/2007 | Nybo et al. |
| 7,201,563 B2 | 4/2007 | Studebaker |
| 7,221,121 B2 | 5/2007 | Skaug |
| 7,244,106 B2 | 7/2007 | Kallaman |
| 7,245,105 B2 | 7/2007 | Joo |
| 7,259,533 B2 | 8/2007 | Yang et al. |
| 7,264,449 B1 | 9/2007 | Harned et al. |
| 7,281,958 B2 | 10/2007 | Schuttler et al. |
| 7,292,898 B2 | 11/2007 | Clark et al. |
| 7,307,538 B2 | 12/2007 | Kochan, Jr. |
| 7,309,216 B1 | 12/2007 | Spadola et al. |
| 7,318,344 B2 | 1/2008 | Heger |
| D562,349 S | 2/2008 | Butler |
| 7,327,275 B2 | 2/2008 | Brochu |
| 7,339,126 B1 | 3/2008 | Niedermeyer |
| D567,189 S | 4/2008 | Stiles, Jr. |
| 7,352,550 B2 | 4/2008 | Mladenik |
| 7,375,940 B1 | 5/2008 | Bertrand |
| 7,388,348 B2 | 6/2008 | Mattichak |
| 7,407,371 B2 | 8/2008 | Leone |
| 7,427,844 B2 | 9/2008 | Mehlhorn |
| 7,429,842 B2 | 9/2008 | Schulman et al. |
| 7,437,215 B2 | 10/2008 | Anderson et al. |
| D582,797 S | 12/2008 | Fraser |
| D583,828 S | 12/2008 | Li |
| 7,458,782 B1 | 12/2008 | Spadola et al. |
| 7,459,886 B1 | 12/2008 | Potanin et al. |
| 7,484,938 B2 | 2/2009 | Allen |
| 7,516,106 B2 | 4/2009 | Ehlers |
| 7,525,280 B2 | 4/2009 | Fagan et al. |
| 7,528,579 B2 | 5/2009 | Pacholok et al. |
| 7,542,251 B2 | 6/2009 | Ivankovic |
| 7,542,252 B2 | 6/2009 | Chan et al. |
| 7,572,108 B2 | 8/2009 | Koehl |
| 7,612,510 B2 | 11/2009 | Koehl |
| 7,612,529 B2 | 11/2009 | Kochan, Jr. |
| 7,623,986 B2 | 11/2009 | Miller |
| 7,641,449 B2 | 1/2010 | Iimura et al. |
| 7,652,441 B2 | 1/2010 | Ho |
| 7,686,587 B2 | 3/2010 | Koehl |
| 7,686,589 B2 | 3/2010 | Stiles et al. |
| 7,690,897 B2 | 4/2010 | Branecky |
| 7,700,887 B2 | 4/2010 | Niedermeyer |
| 7,704,051 B2 | 4/2010 | Koehl |
| 7,727,181 B2 | 6/2010 | Rush |
| 7,739,733 B2 | 6/2010 | Szydlo |
| 7,746,063 B2 | 6/2010 | Sabini et al. |
| 7,751,159 B2 | 7/2010 | Koehl |
| 7,755,318 B1 | 7/2010 | Panosh |
| 7,775,327 B2 | 8/2010 | Abraham |
| 7,777,435 B2 | 8/2010 | Aguilar |
| 7,788,877 B2 | 9/2010 | Andras |
| 7,795,824 B2 | 9/2010 | Shen et al. |
| 7,808,211 B2 | 10/2010 | Pacholok et al. |
| 7,815,420 B2 | 10/2010 | Koehl |
| 7,821,215 B2 | 10/2010 | Koehl |
| 7,845,913 B2 | 12/2010 | Stiles et al. |
| 7,854,597 B2 | 12/2010 | Stiles et al. |
| 7,857,600 B2 | 12/2010 | Koehl |
| 7,874,808 B2 | 1/2011 | Stiles |
| 7,878,766 B2 | 2/2011 | Meza |
| 7,900,308 B2 | 3/2011 | Erlich |
| 7,925,385 B2 | 4/2011 | Stavale et al. |
| 7,931,447 B2 | 4/2011 | Levin et al. |
| 7,945,411 B2 | 5/2011 | Kernan et al. |
| 7,976,284 B2 | 7/2011 | Koehl |
| 7,983,877 B2 | 7/2011 | Koehl |
| 7,990,091 B2 | 8/2011 | Koehl |
| 8,011,895 B2 | 9/2011 | Ruffo |
| 8,019,479 B2 | 9/2011 | Stiles |
| 8,032,256 B1 | 10/2011 | Wolf et al. |
| 8,043,070 B2 | 10/2011 | Stiles |
| 8,049,464 B2 | 11/2011 | Muntermann |
| 8,098,048 B2 | 1/2012 | Hoff |
| 8,104,110 B2 | 1/2012 | Caudill et al. |
| 8,126,574 B2 | 2/2012 | Discenzo et al. |
| 8,133,034 B2 | 3/2012 | Mehlhorn et al. |
| 8,134,336 B2 | 3/2012 | Michalske et al. |
| 8,177,520 B2 | 5/2012 | Mehlhorn |
| 8,281,425 B2 | 10/2012 | Cohen |
| 8,303,260 B2 | 11/2012 | Stavale et al. |
| 8,313,306 B2 | 11/2012 | Stiles et al. |
| 8,316,152 B2 | 11/2012 | Geltner et al. |
| 8,317,485 B2 | 11/2012 | Meza et al. |
| 8,337,166 B2 | 12/2012 | Meza et al. |
| 8,380,355 B2 | 2/2013 | Mayleben et al. |
| 8,405,346 B2 | 3/2013 | Trigiani |
| 8,405,361 B2 | 3/2013 | Richards et al. |
| 8,444,394 B2 | 5/2013 | Koehl |
| 8,465,262 B2 | 6/2013 | Stiles et al. |
| 8,469,675 B2 | 6/2013 | Stiles et al. |
| 8,480,373 B2 | 7/2013 | Stiles et al. |
| 8,500,413 B2 | 8/2013 | Stiles et al. |
| 8,540,493 B2 | 9/2013 | Koehl |
| 8,547,065 B2 | 10/2013 | Trigiani |
| 8,573,952 B2 | 11/2013 | Stiles et al. |
| 8,579,600 B2 | 11/2013 | Vijayakumar et al. |
| 8,602,745 B2 | 12/2013 | Stiles |
| 8,641,383 B2 | 2/2014 | Meza |
| 8,641,385 B2 | 2/2014 | Koehl |
| 8,669,494 B2 | 3/2014 | Tran |
| 8,756,991 B2 | 6/2014 | Edwards |
| 8,763,315 B2 | 7/2014 | Hartman |
| 8,774,972 B2 | 7/2014 | Rusnak |
| 2001/0002238 A1 | 5/2001 | McKain |

(56) References Cited

U.S. PATENT DOCUMENTS

| | | |
|---|---|---|
| 2001/0029407 A1 | 10/2001 | Tompkins |
| 2001/0041139 A1 | 11/2001 | Sabini et al. |
| 2002/0000789 A1 | 1/2002 | Haba |
| 2002/0002989 A1 | 1/2002 | Jones |
| 2002/0010839 A1 | 1/2002 | Tirumalal et al. |
| 2002/0018721 A1 | 2/2002 | Kobayashi |
| 2002/0032491 A1 | 3/2002 | Imamura et al. |
| 2002/0035403 A1 | 3/2002 | Clark et al. |
| 2002/0050490 A1 | 5/2002 | Pittman et al. |
| 2002/0070611 A1 | 6/2002 | Cline et al. |
| 2002/0070875 A1 | 6/2002 | Crumb |
| 2002/0082727 A1 | 6/2002 | Laflamme et al. |
| 2002/0089236 A1 | 7/2002 | Cline et al. |
| 2002/0093306 A1 | 7/2002 | Johnson |
| 2002/0101193 A1 | 8/2002 | Farkas |
| 2002/0111554 A1 | 8/2002 | Drzewiecki |
| 2002/0131866 A1 | 9/2002 | Phillips |
| 2002/0136642 A1 | 9/2002 | Moller |
| 2002/0150476 A1 | 10/2002 | Lucke |
| 2002/0163821 A1 | 11/2002 | Odell |
| 2002/0172055 A1 | 11/2002 | Balakrishnan |
| 2002/0176783 A1 | 11/2002 | Moeller |
| 2002/0190687 A1 | 12/2002 | Bell et al. |
| 2003/0000303 A1 | 1/2003 | Livingston |
| 2003/0017055 A1 | 1/2003 | Fong |
| 2003/0030954 A1 | 2/2003 | Bax et al. |
| 2003/0034284 A1 | 2/2003 | Wolfe |
| 2003/0034761 A1 | 2/2003 | Goto |
| 2003/0048646 A1 | 3/2003 | Odell |
| 2003/0061004 A1 | 3/2003 | Discenzo |
| 2003/0063900 A1 | 4/2003 | Wang et al. |
| 2003/0099548 A1 | 5/2003 | Meza |
| 2003/0106147 A1 | 6/2003 | Cohen et al. |
| 2003/0174450 A1 | 9/2003 | Nakajima et al. |
| 2003/0186453 A1 | 10/2003 | Bell |
| 2003/0196942 A1 | 10/2003 | Jones |
| 2004/0000525 A1 | 1/2004 | Hornsby |
| 2004/0006486 A1 | 1/2004 | Schmidt et al. |
| 2004/0009075 A1 | 1/2004 | Meza |
| 2004/0013531 A1 | 1/2004 | Curry et al. |
| 2004/0016241 A1 | 1/2004 | Street et al. |
| 2004/0025244 A1 | 2/2004 | Lloyd et al. |
| 2004/0055363 A1 | 3/2004 | Bristol |
| 2004/0062658 A1 | 4/2004 | Beck et al. |
| 2004/0064292 A1 | 4/2004 | Beck |
| 2004/0071001 A1 | 4/2004 | Balakrishnan |
| 2004/0080325 A1 | 4/2004 | Ogura |
| 2004/0080352 A1 | 4/2004 | Noda |
| 2004/0090197 A1 | 5/2004 | Schuchmann |
| 2004/0095183 A1 | 5/2004 | Swize |
| 2004/0116241 A1 | 6/2004 | Ishikawa |
| 2004/0117330 A1 | 6/2004 | Ehlers et al. |
| 2004/0118203 A1 | 6/2004 | Heger |
| 2004/0149666 A1 | 8/2004 | Leaverton |
| 2004/0205886 A1 | 10/2004 | Goettel |
| 2004/0213676 A1 | 10/2004 | Phillips |
| 2004/0265134 A1 | 12/2004 | Iimura et al. |
| 2005/0050908 A1 | 3/2005 | Lee et al. |
| 2005/0086957 A1 | 4/2005 | Lifson |
| 2005/0095150 A1 | 5/2005 | Leone et al. |
| 2005/0097665 A1 | 5/2005 | Goettel |
| 2005/0123408 A1 | 6/2005 | Koehl |
| 2005/0133088 A1 | 6/2005 | Bologeorges |
| 2005/0137720 A1 | 6/2005 | Spira et al. |
| 2005/0156568 A1 | 7/2005 | Yueh |
| 2005/0158177 A1 | 7/2005 | Mehlhorn |
| 2005/0167345 A1 | 8/2005 | De Wet et al. |
| 2005/0170936 A1 | 8/2005 | Quinn |
| 2005/0180868 A1 | 8/2005 | Miller |
| 2005/0190094 A1 | 9/2005 | Andersen |
| 2005/0193485 A1 | 9/2005 | Wolfe |
| 2005/0195545 A1 | 9/2005 | Mladenik |
| 2005/0226731 A1 | 10/2005 | Mehlhorn |
| 2005/0235732 A1 | 10/2005 | Rush |
| 2005/0248310 A1 | 11/2005 | Fagan et al. |
| 2005/0260079 A1 | 11/2005 | Allen |
| 2005/0281679 A1 | 12/2005 | Niedermeyer |
| 2005/0281681 A1 | 12/2005 | Anderson |
| 2006/0045750 A1 | 3/2006 | Stiles |
| 2006/0045751 A1 | 3/2006 | Beckman et al. |
| 2006/0078435 A1 | 4/2006 | Burza |
| 2006/0078444 A1 | 4/2006 | Sacher |
| 2006/0090255 A1 | 5/2006 | Cohen |
| 2006/0093492 A1 | 5/2006 | Janesky |
| 2006/0112480 A1* | 6/2006 | Sisk .................. E04H 4/12 |
| | | 4/507 |
| 2006/0127227 A1 | 6/2006 | Mehlhorn |
| 2006/0138033 A1 | 6/2006 | Hoal et al. |
| 2006/0146462 A1 | 7/2006 | McMillian et al. |
| 2006/0169322 A1 | 8/2006 | Torkelson |
| 2006/0204367 A1 | 9/2006 | Meza |
| 2006/0226997 A1 | 10/2006 | Kochan, Jr. |
| 2006/0235573 A1 | 10/2006 | Guion |
| 2006/0269426 A1 | 11/2006 | Llewellyn |
| 2007/0001635 A1 | 1/2007 | Ho |
| 2007/0041845 A1 | 2/2007 | Freudenberger |
| 2007/0061051 A1 | 3/2007 | Maddox |
| 2007/0080660 A1 | 4/2007 | Fagan et al. |
| 2007/0113647 A1 | 5/2007 | Mehlhorn |
| 2007/0114162 A1 | 5/2007 | Stiles et al. |
| 2007/0124321 A1 | 5/2007 | Szydlo |
| 2007/0154319 A1 | 7/2007 | Stiles |
| 2007/0154320 A1 | 7/2007 | Stiles |
| 2007/0154321 A1 | 7/2007 | Stiles |
| 2007/0154322 A1 | 7/2007 | Stiles |
| 2007/0154323 A1 | 7/2007 | Stiles |
| 2007/0160480 A1 | 7/2007 | Ruffo |
| 2007/0163929 A1 | 7/2007 | Stiles |
| 2007/0183902 A1 | 8/2007 | Stiles |
| 2007/0187185 A1 | 8/2007 | Abraham et al. |
| 2007/0188129 A1 | 8/2007 | Kochan, Jr. |
| 2007/0212210 A1 | 9/2007 | Kernan et al. |
| 2007/0212229 A1 | 9/2007 | Stavale et al. |
| 2007/0212230 A1 | 9/2007 | Stavale et al. |
| 2007/0258827 A1 | 11/2007 | Gierke |
| 2007/0261823 A1* | 11/2007 | Masters .................. F24D 17/00 |
| | | 165/110 |
| 2008/0003114 A1 | 1/2008 | Levin et al. |
| 2008/0031751 A1 | 2/2008 | Littwin et al. |
| 2008/0031752 A1 | 2/2008 | Littwin et al. |
| 2008/0039977 A1 | 2/2008 | Clark et al. |
| 2008/0041839 A1 | 2/2008 | Tran |
| 2008/0063535 A1 | 3/2008 | Koehl |
| 2008/0095638 A1 | 4/2008 | Branecky |
| 2008/0095639 A1 | 4/2008 | Bartos |
| 2008/0131286 A1 | 6/2008 | Koehl |
| 2008/0131289 A1 | 6/2008 | Koehl |
| 2008/0131291 A1 | 6/2008 | Koehl |
| 2008/0131294 A1 | 6/2008 | Koehl |
| 2008/0131295 A1 | 6/2008 | Koehl |
| 2008/0131296 A1 | 6/2008 | Koehl |
| 2008/0140353 A1 | 6/2008 | Koehl |
| 2008/0152508 A1 | 6/2008 | Meza |
| 2008/0168599 A1 | 7/2008 | Caudill |
| 2008/0181785 A1 | 7/2008 | Koehl |
| 2008/0181786 A1 | 7/2008 | Meza |
| 2008/0181787 A1 | 7/2008 | Koehl |
| 2008/0181788 A1 | 7/2008 | Meza |
| 2008/0181789 A1 | 7/2008 | Koehl |
| 2008/0181790 A1 | 7/2008 | Meza |
| 2008/0189885 A1 | 8/2008 | Erlich |
| 2008/0229819 A1 | 9/2008 | Mayleben et al. |
| 2008/0260540 A1 | 10/2008 | Koehl |
| 2008/0288115 A1 | 11/2008 | Rusnak et al. |
| 2008/0298978 A1 | 12/2008 | Schulman et al. |
| 2009/0014044 A1 | 1/2009 | Hartman |
| 2009/0038696 A1 | 2/2009 | Levin et al. |
| 2009/0052281 A1 | 2/2009 | Nybo |
| 2009/0104044 A1 | 4/2009 | Koehl |
| 2009/0126806 A1* | 5/2009 | Hamza .................. F04B 49/022 |
| | | 137/511 |
| 2009/0143917 A1 | 6/2009 | Uy et al. |
| 2009/0204237 A1 | 8/2009 | Sustaeta et al. |
| 2009/0204267 A1 | 8/2009 | Sustaeta et al. |

(56) References Cited

U.S. PATENT DOCUMENTS

| | | |
|---|---|---|
| 2009/0208345 A1 | 8/2009 | Moore et al. |
| 2009/0210081 A1 | 8/2009 | Sustaeta et al. |
| 2009/0269217 A1 | 10/2009 | Vijayakumar |
| 2010/0154534 A1 | 6/2010 | Hampton |
| 2010/0166570 A1 | 7/2010 | Hampton |
| 2010/0197364 A1 | 8/2010 | Lee |
| 2010/0303654 A1 | 12/2010 | Petersen et al. |
| 2010/0306001 A1 | 12/2010 | Discenzo |
| 2010/0312398 A1 | 12/2010 | Kidd et al. |
| 2011/0036164 A1 | 2/2011 | Burdi |
| 2011/0044823 A1 | 2/2011 | Stiles |
| 2011/0052416 A1 | 3/2011 | Stiles |
| 2011/0077875 A1 | 3/2011 | Tran |
| 2011/0084650 A1 | 4/2011 | Kaiser et al. |
| 2011/0110794 A1 | 5/2011 | Mayleben et al. |
| 2011/0280744 A1 | 11/2011 | Ortiz et al. |
| 2011/0311370 A1 | 12/2011 | Sloss et al. |
| 2012/0020810 A1 | 1/2012 | Stiles, Jr. et al. |
| 2012/0100010 A1 | 4/2012 | Stiles et al. |

FOREIGN PATENT DOCUMENTS

| | | |
|---|---|---|
| AU | 2007332716 A1 | 6/2008 |
| AU | 2007332769 A1 | 6/2008 |
| CA | 2548437 A1 | 6/2005 |
| CA | 2731482 A1 | 6/2005 |
| CA | 2517040 A1 | 2/2006 |
| CA | 2528580 A1 | 5/2007 |
| CA | 2672410 A1 | 6/2008 |
| CA | 2672459 A1 | 6/2008 |
| CN | 1821574 | 8/2006 |
| CN | 101165352 | 4/2008 |
| DE | 3023463 A1 | 2/1981 |
| DE | 2946049 A1 | 5/1981 |
| DE | 29612980 U1 | 10/1996 |
| DE | 19736079 A1 | 8/1997 |
| DE | 19645129 A1 | 5/1998 |
| DE | 29724347 U1 | 11/2000 |
| DE | 10231773 A1 | 2/2004 |
| DE | 19938490 B4 | 4/2005 |
| EP | 0150068 A2 | 7/1985 |
| EP | 0226858 A1 | 7/1987 |
| EP | 0246769 A2 | 11/1987 |
| EP | 0306814 A1 | 3/1989 |
| EP | 0314249 A1 | 3/1989 |
| EP | 0709575 A1 | 5/1996 |
| EP | 0735273 A1 | 10/1996 |
| EP | 0833436 A2 | 4/1998 |
| EP | 0831188 A3 | 2/1999 |
| EP | 0978657 A1 | 2/2000 |
| EP | 1134421 A1 | 9/2001 |
| EP | 0916026 | 5/2002 |
| EP | 1315929 | 6/2003 |
| EP | 1585205 A2 | 10/2005 |
| EP | 1630422 A2 | 3/2006 |
| EP | 1698815 A1 | 9/2006 |
| EP | 1790858 A1 | 5/2007 |
| EP | 1995462 A2 | 11/2008 |
| EP | 2102503 A2 | 9/2009 |
| EP | 2122171 A1 | 11/2009 |
| EP | 2122172 A1 | 11/2009 |
| EP | 2273125 A1 | 1/2011 |
| FR | 2529965 A1 | 1/1984 |
| FR | 2703409 A1 | 10/1994 |
| GB | 2124304 A1 | 2/1984 |
| JP | 55072678 A | 5/1980 |
| JP | 5010270 A | 1/1993 |
| MX | 2009006258 A1 | 12/2009 |
| WO | 98/04835 A1 | 2/1998 |
| WO | 00/42339 A1 | 7/2000 |
| WO | 01/27508 A1 | 4/2001 |
| WO | 01/47099 A1 | 6/2001 |
| WO | 02/18826 A1 | 3/2002 |
| WO | 03/025442 A1 | 3/2003 |
| WO | 03/099705 A2 | 12/2003 |
| WO | 2004/006416 A1 | 1/2004 |
| WO | 2004/073772 A1 | 9/2004 |
| WO | 2004/088694 A1 | 10/2004 |
| WO | 2005/011473 A1 | 2/2005 |
| WO | 2005011473 A3 | 2/2005 |
| WO | 2005/055694 A1 | 6/2005 |
| WO | 2005111473 A2 | 11/2005 |
| WO | 2006/069568 A1 | 7/2006 |
| WO | 2008/073329 A1 | 6/2008 |
| WO | 2008/073330 A1 | 6/2008 |
| WO | 2008073386 A1 | 6/2008 |
| WO | 2008073413 A1 | 6/2008 |
| WO | 2008073418 A1 | 6/2008 |
| WO | 2008073433 A1 | 6/2008 |
| WO | 2008073436 A1 | 6/2008 |
| WO | 2011/100067 A1 | 8/2011 |
| ZA | 200506869 | 5/2006 |
| ZA | 200509691 | 11/2006 |
| ZA | 200904747 | 7/2010 |
| ZA | 200904849 | 7/2010 |
| ZA | 200904850 | 7/2010 |

OTHER PUBLICATIONS 205-24-Exh23—Plaintiff's Preliminary Disclosure of Asserted Claims and Preliminary Infringement Contentions; cited in Civil Action 5:11-cv-00459; Feb. 21, 2012.
PX-34—Pentair; "IntelliTouch Pool & Spa Control System User's Guide"; pp. 1-129; 2011; cited in Civil Action 5:11-cv-00459; 2011.
PX-138—Deposition of Dr. Douglas C. Hopkins; pp. 1-391; 2011; taken in Civil Action 10-cv-1662.
PX-141—Danfoss; "Whitepaper Automatic Energy Optimization;" pp. 1-4; 2011; cited in Civil Action 5:11-cv-00459.
9PX10—Pentair; "IntelliPro VS+SVRS Intelligent Variable Speed Pump;" 2011; pp. 1-6; cited in Civil Action 5:11-cv-00459D.
9PX11—Pentair; "IntelliTouch Pool & Spa Control Control Systems;" 2011; pp. 1-5; cited in Civil Action 5:11-cv-004590.
Robert S. Carrow; "Electrician's Technical Reference—Variable Frequency Drives;" 2001; pp. 1-194.
Baldor; "Balder Motors and Drives Series 14 Vector Drive Control Operating & Technical Manual;" Mar. 22, 1992; pp. 1-92.
Commander; "Commander SE Advanced User Guide;" Nov. 2002; pp. 1-118.
Baldor; "Baldor Series 10 Inverter Control: Installation and Operating Manual"; Feb. 2000; pp. 1-74.
Dinverter; "Dinverter 28 User Guide;" Nov. 1998; pp. 1-94.
Pentair Pool Products, "IntelliFlo 4x160 a Breakthrough Energy-Efficiency and Service Life;" pp. 1-4; Nov. 2005; www.pentairpool.com.
Pentair Water and Spa, Inc. "The Pool Pro's guide to Breakthrough Efficiency, Convenience & Profitability," pp. 1-8, Mar. 2006; www.pentairpool.com.
Danfoss; "VLT8000 Aqua Instruction Manual;" Apr. 16, 2004; pp. 1-71.
"Product Focus—New AC Drive Series Target Water, Wastewater Applications;" WaterWorld Articles; Jul. 2002; pp. 1-2.
Pentair, "Pentair RS-485 Pool Controller Adapter" Published Advertisement; Mar. 22, 2002; pp. 1-2.
Compool; "Compool CP3800 Pool-Spa Control System Installation and Operating Instructions;" Nov. 7, 1997; pp. 1-45.
Hayward; "Hayward Pro-Series High-Rate Sand Filter Owner's Guide," 2002; pp. 1-4.
Danfoss; "Danfoss VLT 6000 Series Adjustable Frequency Drive Installation, Operation and Maintenance Manual;" Mar. 2000; pp. 1-118.
Brochure entitled "Constant Pressure Water for Private Well Systems," for Myers Pentair Pump Group, Jun. 28, 2000.
Brochure for AMTROL, Inc. entitled "AMTROL unearths the facts about variable speed pumps and constant pressure valves," Mar. 2002.
Undated Goulds Pumps "Balanced Flow Systems" Installation Record.
Texas Instruments, Digital Signal Processing Solution for AC Induction Motor, Application Note, BPRA043 (1996).

(56) References Cited

OTHER PUBLICATIONS

Texas Instruments, Zhenyu Yu and David Figoli, DSP Digital Control System Applications—AC Induction Motor Control Using Constant V/Hz Principle and Space Vector PWM Technique with TMS320C240, Application Report No. SPRA284A (Apr. 1998).
Texas Instruments, TMS320F/C240 DSP Controllers Reference Guide Peripheral Library and Specific Devices, Literature No. SPRU 161D (Nov. 2002).
Texas Instruments, MSP430x33x—Mixed Signal Microcontrollers, SLAS 163 (Feb. 1998).
Microchip Technology, Inc., PICMicro Mid-Range MCU Family Reference Manual (Dec. 1997).
7—Motion for Preliminary Injunction by Danfoss Drives A/S & Pentair Water Pool & Spa, Inc. with respect to Civil Action No. 5:11-cv-00459D.
540X48—Hopkins; "Partitioning Oigitally . . . Applications to Ballasts;" pp. 1-6; cited in Civil Action 5:11-cv-00459D.
Load Controls Incorporated, product web pages including Affidavit of Christopher Butler of Internet Archive attesting to the authenticity of the web pages, dated Apr. 17, 2013, 19 pages.
Cliff Wyatt, "Monitoring Pumps," World Pumps, vol. 2004, Issue 459, Dec. 2004, pp. 17-21.
Wen Technology, Inc., Unipower® HPL110 Digital Power Monitor Installation and Operation, copyright 1999, pp. 1-20, Raleigh, North Carolina.
Wen Technology, Inc., Unipower® HPL110, HPL420 Programming Suggestions for Centrifugal Pumps, copyright 1999, 4 pages, Raleigh, North Carolina.
Danfoss, VLT® AQUA Drive, "The ultimate solution for Water, Wastewater, & Irrigation", May 2007, pp. 1-16.
Danfoss, SALT Drive Systems, "Increase oil & gas production, Minimize energy consumption", copyright 2011, pp. 1-16.
Schlumberger Limited, Oilfield Glossary, website Search Results for "pump-off", copyright 2014, 1 page.
45—Plaintiffs' Reply to Defendants' Answer to Complaint & Counterclaim for Civil Action 5:11-cv-00459D.
50—Amended Answer to Complaint & Counterclaim by Defendants for Civil Action 5:11-cv-00459D.
54DX32—Hopkins; "High-Temperature, High-Density . . . Embedded Operation;" pp. 1-8; cited in Civil Action 5:11-cv-00459D.
Pent Air; "Pentair IntelliTouch Operating Manual;" May 22, 2003; pp. 1-60.
USPTO Patent Trial and Appeal Board, Paper 43—Final Written Decision, Case IPR2013-00287, U.S. Pat. No. 7,704,051 B2, Nov. 19, 2014, 28 pages.
Danfoss, VLT 8000 AQUA Operating Instructions, coded MG.80.A2.02 in the footer, 181 pages.
Per Brath—Danfoss Drives A/S, Towards Autonomous Control of HVAC Systems, thesis with translation of Introduction, Sep. 1999, 216 pages.
Karl Johan Åström and Björn Wittenmark—Lund Institute of Technology, Adaptive Control—Second Edition, book, Copyright 1995, 589 pages, Addison-Wesley Publishing Company, United States and Canada.
Bimal K. Bose—The University of Tennessee, Knoxville, Modem Power Electronics and AC Drives, book, Copyright 2002, 728 pages, Prentice-Hall, Inc., Upper Saddle River, New Jersey.
Waterworld, New AC Drive Series Targets Water, Wastewater Applications, magazine, Jul. 2002, 5 pages, vol. 18, Issue 7.
Texas Instruments, TMS320F/C240 DSP Controllers Peripheral Library and Specific Devices, Reference Guide, Nov. 2002, 485 pages, printed in U.S.A.
Microchip Technology Inc., PICmicro® Advanced Analog Microcontrollers for 12-Bit ADC on 8-Bit MCUs, convert to Microchip, brochure, Dec. 2000, 6 pages, Chandler, Arizona.
W.K. Ho, S.K. Panda, K.W. Lim, F.S. Huang—Department of Electrical Engineering, National University of Singapore, Gain-scheduling control of the Switched Reluctance Motor, Control Engineering Practice 6, copyright 1998, pp. 181-189, Elsevier Science Ltd.
Jan Eric Thorsen—Danfoss, Technical Paper—Dynamic simulation of DH House Stations, presented by 7. Dresdner Femwärme-Kolloquium Sep. 2002, 10 pages, published in Euro Heat & Power Jun. 2003.
Texas Instruments, TMS320F/C240 DSP Controllers Reference Guide, Peripheral Library and Specific Devices, Jun. 1999, 474 pages.
Rajwardhan Patil, et al., A Multi-Disciplinary Mechatronics Course with Assessment—Integrating Theory and Application through Laboratory Activities, International Journal of Engineering Education, copyright 2012, pp. 1141-1149, vol. 28, No. 5, TEMPUS Publications, Great Britain.
James Shirley, et al., A mechatronics and material handling systems laboratory: experiments and case studies, International Journal of Electrical Engineering Education 48/1, pp. 92-103.
Board Decision for Appeal 2015-007909, Reexamination Control 95/002,008, U.S. Pat. No. 7,686,587B2 dated Apr. 1, 2016.
Flotec Owner's Manual, dated 2004. 44 pages.
Glentronics Home Page, dated 2007. 2 pages.
Goulds Pumps SPBB Battery Back-Up Pump Brochure, dated 2008. 2 pages.
Goulds Pumps SPBB/SPBB2 Battery Backup Sump Pumps, dated 2007.
ITT Red Jacket Water Products Installation, Operation and Parts Manual, dated 2009. 8 pages.
Liberty Pumps PC-Series Brochure, dated 2010. 2 pages.
"Lift Station Level Control" by Joe Evans PhD, www.pumped101.com, dated Sep. 2007. 5 pages.
The Basement Watchdog A/C-D/C Battery Backup Sump Pump System Instruction Manual and Safety Warnings, dated 2010. 20 pages.
The Basement Watchdog Computer Controlled A/C-D/C Sump Pump System Instruction Manual, dated 2010. 17 pages.
Pentair Water Ace Pump Catalog, dated 2007, 44 pages.
ITT Red Jacket Water Products RJBB/RJBB2 Battery Backup Sump Pumps; May 2007, 2 pages.
Allen-Bradley; "1336 Plus II Adjustable Frequency AC Drive with Sensorless Vector User Manual;" Sep. 2005; pp. 1-212.
51—Response by Defendants in Opposition to Motion for Preliminary Injunction for Civil Action 5:11-cv-00459D; Dec. 2, 2011.
Amended Complaint Filed by Pentair Water Pool & Spa, Inc. and Danfoss Drives A/S with respect to Civil Action No. 5:11-cv-00459, adding U.S. Pat. No. 8,043,070.
53—Declaration of Douglas C. Hopkins & Exhibits re Response Opposing Motion for Preliminary Injunction for Civil Action 5:11-cv-00459D; Dec. 2, 2011.
89—Reply to Response to Motion for Preliminary Injunction Filed by Danfoss Drives A/S & Pentair Water Pool & Spa, Inc. for Civil Action 5:11-cv-004590; Jan. 3, 2012.
105—Declaration re Memorandum in Opposition, Declaration of Lars Hoffmann Berthelsen for Civil Action 5:11-cv-00459D; Jan. 11, 2012.
112—Amended Complaint Against All Defendants, with Exhibits for Civil Action 5:11-cv-00459D; Jan. 17, 2012.
119—Order Denying Motion for Preliminary Injunction for Civil Action 5:11-cv-00459D; Jan. 23, 2012.
123—Answer to Amended Complaint, Counterclaim Against Danfoss Drives A/S, Pentair Water Pool & Spa, Inc. for Civil Action 5:11-cv-00459D; Jan. 27, 2012.
152—Order Denying Motion for Reconsideration for Civil Action 5:11-cv-00459D; Apr. 4, 2012.
168—Amended Motion to Stay Action Pending Reexamination of Asserted Patents by Defendants for Civil Action 5:11-cv-004590; Jun. 13, 2012.
174—Notice and Attachments re Joint Claim Construction Statement for Civil Action 5:11-cv-00459D; Jun. 5, 2012.
186—Order Setting Hearings—Notice of Markman Hearing Set for Oct. 17, 2012 for Civil Action 5:11-cv-00459D; Jul. 12, 2012.
204—Response by Plaintiffs Opposing Amended Motion to Stay Action Pending Reexamination of Asserted Patents for Civil Action 5:11-cv-004590; Jul. 2012.
210—Order Granting Joint Motion for Leave to Enlarge Page Limit for Civil Action 5:11-cv-004590; Jul. 2012.

(56) References Cited

OTHER PUBLICATIONS

218—Notice re Plaintiffs re Order on Motion for Leave to File Excess Pages re Amended Joint Claim Construction Statement for Civil Action 5:11-cv-004590; Aug. 2012.
54DX16—Hayward EcoStar Technical Guide (Version2); 2011; pp. 1-51; cited in Civil Action 5:11-cv-004590.
54DX17—Hayward ProLogic Automation & Chlorination Operation Manual (Rev. F); pp. 1-27; Elizabeth, NJ; cited in Civil Action 5:11-cv-004590; Dec. 2, 2011.
54DX18—STMicroelectronics; "AN1946—Sensorless BLOC Motor Control & BEMF Sampling Methods with ST7MC;" 2007; pp. 1-35; Civil Action 5:11-cv-004590.
54DX19—STMicroelectronics; "AN1276 BLOC Motor Start Routine for ST72141 Microcontroller;" 2000; pp. 1-18; cited in Civil Action 5:11-cv-004590.
54DX21—Danfoss; "VLT 8000 Aqua Instruction Manual;" Apr. 2004; 1-210; Cited in Civil Action 5:11-cv-004590.
54DX22—Danfoss; "VLT 8000 Aqua Instruction Manual;" pp. 1-35; cited in Civil Action 5:11-cv-004590; Dec. 2, 2011.
54DX23—Commander; "Commander SE Advanced User Guide;" Nov. 2002; pp. 1-190; cited in Civil Action 5:11-cv-004590.
540X30—Sabbagh et al.; "A Model for OptimaL.Control of Pumping Stations in Irrigation Systems;" Jul. 1988; NL pp. 119-133; Civil Action 5:11-cv-004590.
540X31—0anfoss; "VLT 5000 FLUX Aqua OeviceNet Instruction Manual;" Apr. 28, 2003; pp. 1-39; cited in Civil Action 5:11-cv-004590.
540X32—0anfoss; "VLT 5000 FLUX Aqua Profibus Operating Instructions;" May 22, 2003; 1-64; cited in Civil Action 5:11-cv-004590.
540X33—Pentair; "IntelliTouch Owner's Manual Set-Up & Programming;" May 22, 2003; Sanford, NC; pp. 1-61; cited in Civil Action 5:11-cv-004590.
540X34—Pentair; "Compool3800 Pool-Spa Control System Installation & Operating Instructions;" Nov. 7, 1997; pp. 1-45; cited in Civil Action 5:11-cv-004590.
540X35—Pentair Advertisement in "Pool & Spa News;" Mar. 22, 2002; pp. 1-3; cited in Civil Action 5:11-cv-004590.
5540X36—Hayward; "Pro-Series High-Rate Sand Filter Owner's Guide;" 2002; Elizabeth, NJ; pp. 1-5; cited in Civil Action 5:11-cv-00459D.
540X37—Danfoss; "VLT 8000 Aqua Fact Sheet;" Jan. 2002; pp. 1-3; cited in Civil Action 5:11-cv-004590.
540X38—0anfoss; "VLT 6000 Series Installation, Operation & Maintenance Manual;" Mar. 2000; pp. 1-118; cited in Civil Action 5:11-cv-004590.
540X45—Hopkins; "Synthesis of New Class of Converters that Utilize Energy Recirculation;" pp. 1-7; cited in Civil Action 5:11-cv-004590; 1994.
540X46—Hopkins; "High-Temperature, High-Oensity . . . Embedded Operation;" pp. 1-8; cited in Civil Action 5:11-cv-004590; Mar. 2006.
540X47—Hopkins; "Optimally Selecting Packaging Technologies . . . Cost & Performance;" pp. 1-9; cited in Civil Action 5:11-cv-004590; Jun. 1999.
9PX5—Pentair; Selected Website Pages; pp. 1-29; cited in Civil Action 5:11-cv-004590; Sep. 2011.
9PX6—Pentair; "IntelliFio Variable Speed Pump" Brochure; 2011; pp. 1-9; cited in Civil Action 5:11-cv-004590.
9PX7—Pentair; "IntelliFio VF Intelligent Variable Flow Pump;" 2011; pp. 1-9; cited in Civil Action 5:11-cv-004590.
9PX8—Pentair; "IntelliFio VS+SVRS Intelligent Variable Speed Pump;" 2011; pp. 1-9; cited in Civil Action 5:11-cv-004590.
9PX9—Sta-Rite; "IntelliPro Variable Speed Pump;" 2011; pp. 1-9; cited in Civil Action 5:11-cv-004590.
9PX14—Pentair; "IntelliFio Installation and User's Guide;" pp. 1-53; Jul. 26, 2011; Sanford, NC; cited in Civil Action 5:11-cv-004590.

9PX16—Hayward Pool Products; "EcoStar Owner's Manual (Rev. B);" pp. 1-32; Elizabeth, NJ; cited in Civil Action 5:11-cv-00459D; 2010.
9PX17—Hayward Pool Products; "EcoStar & EcoStar SVRS Brochure;" pp. 1-7; Elizabeth, NJ; cited in Civil Action 5:11-cv-00459D; Sep. 30, 2011.
9PX19—Hayward Pool Products;"Hayward Energy Solutions Brochure;" pp. 1-3; www.haywardnet.com; cited in Civil Action 5:11-cv-00459D; Sep. 2011.
9PX20—Hayward Pool Products; "ProLogic Installation Manual (Rev. G);" pp. 1-25; Elizabeth, NJ; cited in Civil Action 5:11-cv-00459D; Sep. 2011.
9PX21—Hayward Pool Products; "ProLogic Operation Manual (Rev. F);" pp. 1-27; Elizabeth, NJ; cited in Civil Action 5:11-cv-00459D; Sep. 2011.
9PX22—Hayward Pool Products; "Wireless & Wired Remote Controls Brochure;" pp. 1-5; 2010; Elizabeth, NJ; cited in Civil Action 5:11-cv-00459D.
9PX23—Hayward Pool Products; Selected Pages from Hayward's Website:/www.hayward-pool.com; pp. 1-27; cited in Civil Action 5:11-cv-004590; Sep. 2011.
9PX28—Hayward Pool Products; "Selected Page from Hayward's Website Relating to EcoStar Pumps;" p. 1; cited in Civil Action 5:11-cv-00459D; Sep. 2011.
9PX29—Hayward Pool Products; "Selected Page from Hayward's Website Relating to EcoStar SVRS Pumps;" cited in Civil Action 5:11-cv-00459; Sep. 2011.
9PX30—Hayward Pool Systems; "Selected Pages from Hayward's Website Relating to ProLogic Controllers;" pp. 1-5; Civil Action 5:11-cv-00459D; Sep. 2011.
U.S. Appl. No. 12/869,570 Appeal Decision dated May 24, 2016.
Bibliographic Data Sheet—U.S. Appl. No. 10/730,747 Applicant: Robert M. Koehl Reasons for Inclusion: Printed publication US 2005/0123408 A1 for U.S. Appl. No. 10/730,747 has incorrect filing date.
Shabnam Moghanrabi; "Better, Stronger, Faster;" Pool & Spa News, Sep. 3, 2004; pp. 1-5; www/poolspanews.com.
Grundfos Pumps Corporation; "The New Standard in Submersible Pumps;" Brochure; pp. 1-8; Jun. 1999; Fresno, CA USA.
Grundfos Pumps Corporation; "Grundfos SQ/SQE Data Book;" pp. 1-39; Jun. 1999; Fresno, CA USA.
Goulds Pumps; "Balanced Flow System Brochure;" pp. 1-4; 2001.
Goulds Pumps; "Balanced Flow Submersible System Installation, Operation & Trouble-Shooting Manual;" pp. 1-9; 2000; USA.
Goulds Pumps; "Balanced Flow Submersible System Informational Seminar;" pp. 1-22; Undated.
Goulds Pumps; "Balanced Flow System Variable Speed Submersible Pump" Specification Sheet; pp. 1-2; Jan. 2000; USA.
Goulds Pumps; Advertisement from "Pumps & Systems Magazine;" entitled "Cost Effective Pump Protection+ Energy Savings," Jan. 2002; Seneca Falls, NY.
Goulds Pumps; "Hydro-Pro Water System Tank Installation, Operation & Maintenance Instructions;" pp. 1-30; Mar. 31, 2001; Seneca Falls, NY USA.
Goulds Pumps; "Pumpsmart Control Solutions" Advertisement from Industrial Equipment News; Aug. 2002; New York, NY USA.
Goulds Pumps; "Model BFSS List Price Sheet;" Feb. 5, 2001.
Goulds Pumps; "Balanced Flow System Model BFSS Variable Speed Submersible Pump System" Brochure; pp. 1-4; Jan 2001; USA.
Goulds Pumps; "Balanced Flow System Model BFSS Variable Speed Submersible Pump" Brochure; pp. 1-3; Jan. 2000; USA.
Goulds Pumps; "Balanced Flow System . . . The Future of Constant Pressure Has Arrived;" Undated Advertisement.
AMTROL Inc.; "AMTROL Unearths the Facts About Variable Speed Pumps and Constant Pressure Valves;" pp. 1-5; Mar. 2002; West Warwick, RI USA.
Franklin Electric; "CP Water-Subdrive 75 Constant Pressure Controller" Product Data Sheet; May 2001; Bluffton, IN USA.
Franklin Electric; "Franklin Aid, Subdrive 75: You Made It Better;" vol. 20, No. 1; pp. 1-2; Jan./Feb. 2002; www.franklin-electric.com.
Grundfos; "SQ/SQE—A New Standard in Submersible Pumps;" Undated Brochure; pp. 1-14; Denmark.

(56) References Cited

OTHER PUBLICATIONS

Grundfos; "JetPaq—The Complete Pumping System;" Undated Brochure; pp. 1-4; Clovis, CA USA.
Email Regarding Grundfos' Price Increases/SQ/SQE Curves; pp. 1-7; Dec. 19, 2001.
F.E. Myers; "Featured Product: F.E. Myers Introducts Revolutionary Constant Pressure Water System;" pp. 1-8; Jun. 28, 2000; Ashland, OH USA.
"Water Pressure Problems" Published Article; The American Well Owner; No. 2, Jul. 2000.
Bjarke Soerensen; "Have You Chatted With Your Pump Today?" Undated Article Reprinted with Permission of Grundfos Pump University; pp. 1-2; USA.
"Understanding Constant Pressure Control;" pp. 1-3; Nov. 1, 1999.
"Constant Pressure is the Name of the Game;" Published Article from National Driller; Mar. 2001.
SJE-Rhombus; "Variable Frequency Drives for Constant Pressure Control;" Aug. 2008; pp. 1-4; Detroit Lakes, MN USA.
SJE-Rhombus; "Constant Pressure Controller for Submersible Well Pumps;" Jan. 2009; pp. 1-4; Detroit Lakes, MN USA.
SJE-Rhombus; "SubCon Variable Frequency Drive;" Dec. 2008; pp. 1-2; Detroit Lakes, MN USA.
Grundfos; "SmartFio SQE Constant Pressure System;" Mar. 2002; pp. 1-4; Olathe, KS USA.
Grundfos; "Grundfos SmartFio SQE Constant Pressure System;" Mar. 2003; pp. 1-2; USA.
Grundfos; "Uncomplicated Electronics . . . Advanced Design;" pp. 1-10; Undated.
Grundfos; "CU301 Installation & Operation Manual;" Apr. 2009; pp. 1-2; Undated; www.grundfos.com.
Grundfos; "CU301 Installation & Operating Instructions;" Sep. 2005; pp. 1-30; Olathe, KS USA.
ITT Corporation; "Goulds Pumps Balanced Flow Submersible Pump Controller;" Jul. 2007; pp. 1-12.
ITT Corporation; "Goulds Pumps Balanced Flow;" Jul. 2006; pp. 1-8.
ITT Corporation; "Goulds Pumps Balanced Flow Constant Pressure Controller for 2 HP Submersible Pumps;" Jun. 2005; pp. 1-4 USA.
ITT Corporation; "Goulds Pumps Balanced Flow Constant Pressure Controller for 3 HP Submersible Pumps;" Jun. 2005; pp. 1-4; USA.
Franklin Electric; Constant Pressure in Just the Right Size; Aug. 2006; pp. 1-4; Bluffton, IN USA.
Franklin Electric; "Franklin Application Installation Data;" vol. 21, No. 5, Sep./Oct. 2003; pp. 1-2; www.franklin-electric.com.
Franklin Electric; "Monodrive MonodriveXT Single-Phase Constant Pressure;" Sep. 2008; pp. 1-2; Bluffton, IN USA.
Docket Report for Case No. 5:11-cv-00459-D; Nov. 2012.
1—Complaint Filed by Pentair Water Pool & Spa, Inc. and Danfoss Drives A/S with respect to Civil Action No. 5:11-cv-00459-D; Aug. 31, 2011.
7—Motion for Preliminary Injunction by Danfoss Drives AIS & Pentair Water Pool & Spa, Inc. with respect to Civil Action No. 5:11-cv-00459-D; Sep. 30, 2011.
22—Memorandum in Support of Motion for Preliminary Injunction by Plaintiffs with respect to Civil Action 5:11-cv-00459-D; Sep. 2, 2011.
23—Declaration of E. Randolph Collins, Jr. in Support of Motion for Preliminary Injunction with respect to Civil Action 5:11-cv-00459-D; Sep. 30, 2011.
24—Declaration of Zack Picard in Support of Motion for Preliminary Injunction with respect to Civil Action 5:11-cv-00459-D; Sep. 30, 2011.
32—Answer to Complaint with Jury Demand & Counterclaim Against Plaintiffs by Hayward Pool Products & Hayward Industries for Civil Action 5:11-cv-004590; Oct. 12, 2011.
USPTO Patent Trial and Appeal Board, Paper 47—Final Written Decision, Case IPR2013-00285, U.S. Pat. No. 8,019,479 B2, Nov. 19, 2014, 39 pages.
Pentair Pool Products, WhisperFlo Pump Owner's Manual, Jun. 5, 2001, 10 pages.

\* cited by examiner

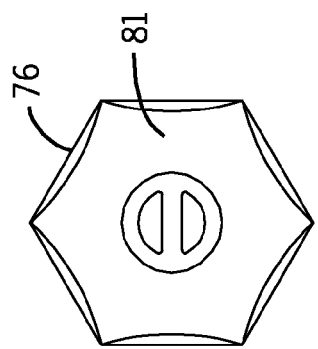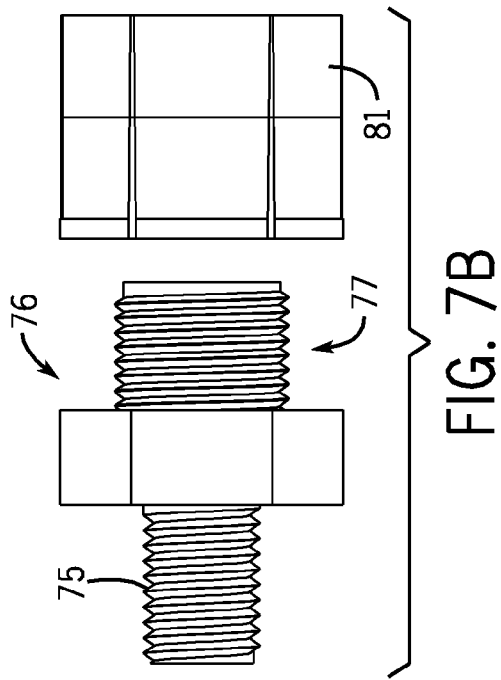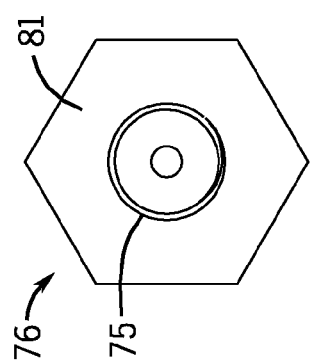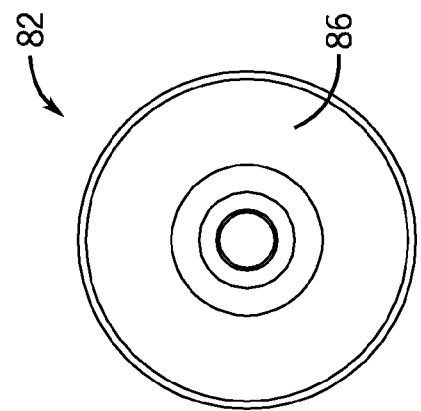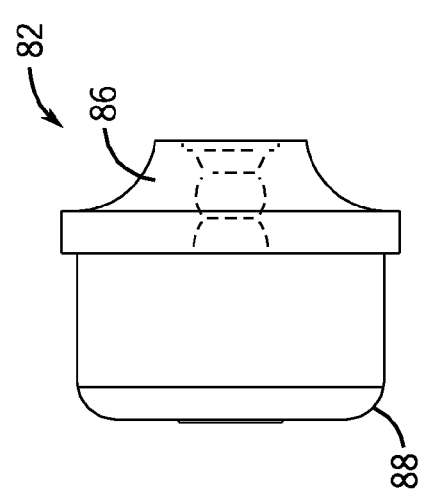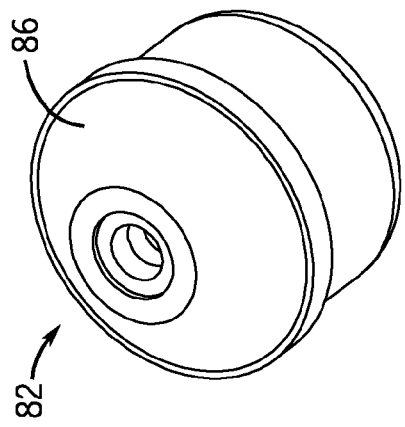

US 9,568,005 B2

DISCHARGE VACUUM RELIEF VALVE FOR SAFETY VACUUM RELEASE SYSTEM

RELATED APPLICATIONS

This application claims priority to U.S. Provisional Patent Application No. 61/421,069 filed on Dec. 8, 2010, and U.S. patent application Ser. No. 13/314,798 filed on Dec. 8, 2011, the entire contents of which are incorporated herein by reference.

BACKGROUND

In swimming pools and spas, safety vacuum release systems (SVRS) have been developed for the removal of suction in a line of the circulation system between the pump and a blocked outlet. SVRS devices can shut down the pump when a blockage is detected at a pool drain and the suction side of the pump in order to relieve suction and prevent body entrapment. If a check valve is installed on a discharge side of the circulation system, for example to prevent the backflow of water, it can also prevent or slow the relief of the suction. As a result, vacuum forces, such as those entrapping a swimmer against a drain of the swimming pool, may remain in place longer than current standards allow. In some swimming pools, the presence of a check valve can render an SVRS device ineffective.

SUMMARY

Some embodiments provide a discharge vacuum relief valve kit to provide vacuum relief for a SVRS pump in a hydraulic system. The discharge vacuum relief valve kit includes a vacuum vent tube including a first end and a second end, a discharge vacuum relief valve coupled to the first end of the vacuum vent tube, and a vacuum vent screen coupled to the second end of the vacuum vent tube. The discharge vacuum relief valve is coupled to a drain plug opening of the SVRS pump.

Some embodiments provide a method of providing discharge vacuum relief for a safety vacuum release system pump in a hydraulic system with discharge check valves. The method includes the steps of providing a discharge vacuum relief valve kit including a vacuum vent tube with a first end and a second end, a discharge vacuum relief valve coupled to the first end of the vacuum vent tube, and a vacuum vent screen coupled to the second end of the vacuum vent tube. Input power to the safety vacuum release system pump is monitored to detect a vacuum event on a suction side of the safety vacuum release system pump. The safety vacuum release system pump is shut down when the vacuum event is detected on the suction side in order to relieve the vacuum event. Pressure is monitored on a discharge side of the safety vacuum release system pump and the discharge side of the safety vacuum release system pump is vented when a vacuum is detected on the discharge side to prevent delayed response time in relieving the vacuum event on the suction side.

Some embodiments provide a method of providing discharge vacuum relief for a safety vacuum release system pump in a hydraulic system with discharge check valves. A vacuum vent tube with a first end and a second end is provided. A discharge vacuum relief valve is coupled to the first end of the vacuum vent tube. The vacuum vent tube is routed upward from its first end. A vacuum vent screen is coupled to the second end of the vacuum vent tube and the safety vacuum release system pump is vented when a vacuum is detected.

DESCRIPTION OF THE DRAWINGS

FIGS. 7A-7C are front, side, and rear views, respectively, and example dimensions of a discharge vacuum relief valve for use with the discharge vacuum relief valve kit of FIG. 6.

FIGS. 8A-8C are perspective, side, and rear views, respectively, and example dimensions of a vacuum vent screen for use with the discharge vacuum relief valve kit of FIG. 6.

DETAILED DESCRIPTION

Figure 1:
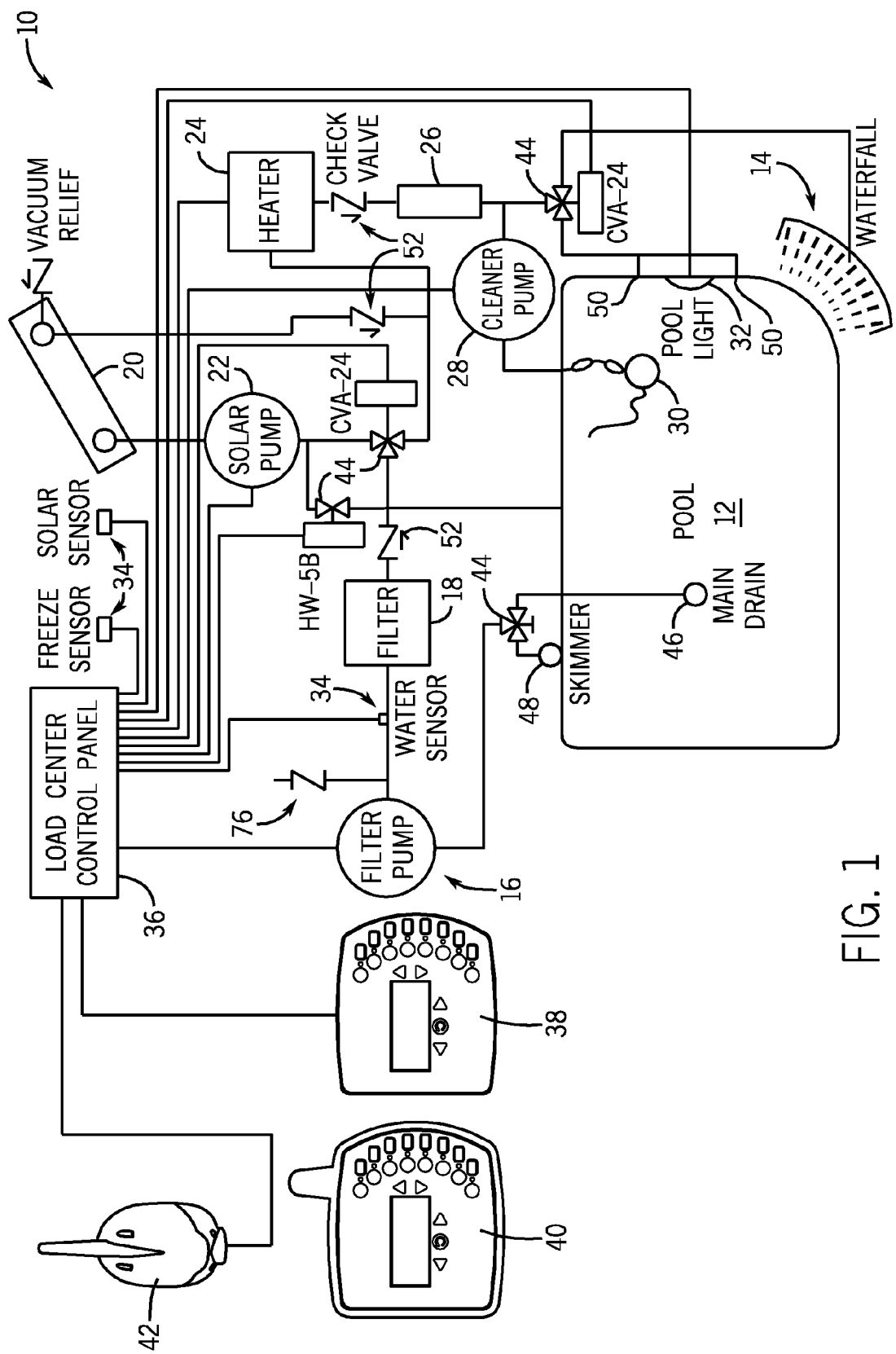
FIG. 1 is a schematic view of a hydraulic system with a discharge vacuum relief valve according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention provide a hydraulic system including a pump with a SVRS, discharge check valves, and a discharge vacuum relief valve. The discharge vacuum relief valve can help prevent a vacuum on a suction side of the hydraulic system from being transferred to a discharge side of the hydraulic system, affecting the discharge check valves and interfering with suction relief generated by the SVRS. As a result, the SVRS can react to suction events, such as body entrapment, virtually undisturbed by the presence of the discharge check valves.

FIG. 1 illustrates a hydraulic system 10 in which embodiments of the invention can be used. The hydraulic system 10 can include a swimming pool 12 and/or other water features, such as a waterfall 14. In some embodiments, the hydraulic system 10 can also include a spa (not shown). The hydraulic system 10 can include a main pump 16 and other components such as a filter 18, a solar heating system 20 with a solar pump 22, a heater 24, a chlorine generator 26, a cleaner pump 28 for a pool cleaner 30, a pool light 32, sensors 34, etc. A controller load center 36, including a wired control panel 38 and/or a wireless control panel 40 and a wireless transceiver 42, can control the components of the hydraulic system 10. In other embodiments, the hydraulic system 10 can include more or less components than those shown in FIG. 1.

Water can be directed through the hydraulic system 10 by the pumps 16, 22, 28 and a series of multi-port valves 44. For example, water can be drained from the swimming pool 12 through a main drain 46 and/or a skimmer 48, can be filtered, heated, and/or chlorinated, and then supplied back to the swimming pool 12 through the pool cleaner 30, discharge outlets 50, and/or the waterfall 14. The hydraulic system 10 can also include one or more discharge check valves 52 located at one or more locations along a discharge side of the hydraulic system 10 (e.g., on a discharge or pressure side of the main pump 16, as opposed to a supply or suction side). The discharge check valves 52 can prevent water from draining from the plumbing and equipment located on the discharge side of the hydraulic system 10. For example, the discharge check valve 52 between the heater 24 and the chlorine generator 26 can prevent the backflow of chlorine into the heater 24. In another example, the discharge check valve 52 between the solar heating system 20 and the heater 24 can prevent the backflow of water into the solar heating system 20 when it is not in use.

Figure 2:
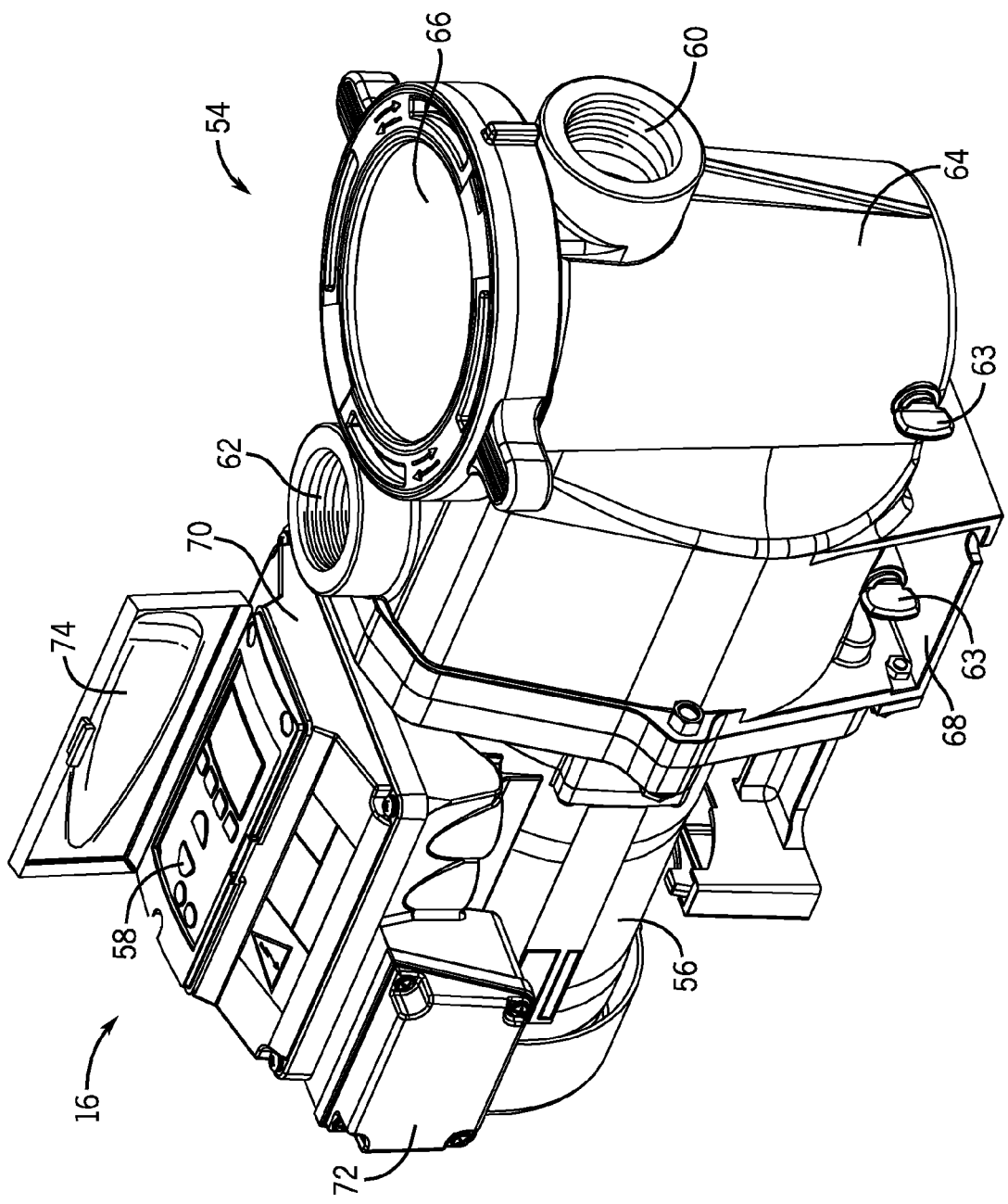
FIG. 2 is a perspective view of a safety vacuum release system (SVRS) pump for use with the system of FIG. 1.

In some embodiments, the main pump 16 can be a variable speed, SVRS (SVRS) pump, as shown in FIG. 2. The main pump 16 can include a housing 54, a variable speed motor 56, and an on-board controller 58. In one embodiment, the motor 56 can be driven at four or more different speeds. The housing 54 can include an inlet 60, an outlet 62, one or more drain plugs 63, a basket 64, a lid 66, and a stand 68. The stand 68 can support the motor 56 and can be used to mount the main pump 16 on a suitable surface (not shown).

In some embodiments, the on-board controller 58 can be enclosed in a case 70. The case 70 can include a field wiring compartment 72 and a cover 74. The cover 74 can be opened and closed to allow access to the on-board controller 58 and protect it from moisture, dust, and other environmental influences. The case 70 can be mounted on the motor 56. In some embodiments, the field wiring compartment 72 is capable of being coupled to a power supply to provide power to the motor 56 and the on-board controller 58.

In some embodiments, the motor 56 can include a coupling (not shown) to connect to the on-board controller 58. In some embodiments, the on-board controller 58 can automatically operate the main pump 16 according to at least one schedule. In some embodiments, the on-board controller 58 can allow a manual operation of the main pump 16. For example, in some embodiments, the on-board controller 58 can include a manual override. The manual override can interrupt the scheduled and/or manual operation of the main pump 16 to allow for, e.g., cleaning and maintenance procedures.

In some embodiments, the on-board controller 58 can monitor the operation of the main pump 16 and can indicate abnormal conditions of the main pump 16. For example, the on-board controller 58 (e.g., internal software of the on-board controller 58) can include the SVRS in order to stop or shut down the main pump 16 when a vacuum is detected (e.g., due to a blockage such as body entrapment) in order to relieve the vacuum. The SVRS can be used as a protective device to prevent a body entrapment event on suction fittings like the main drain 46 of the swimming pool 12 or a spa. In one embodiment, a vacuum event can be detected by monitoring changes in input power to the motor 56.

In conventional hydraulic systems, when discharge check valves are used in conjunction with a SVRS, they can reduce the reaction time on the SVRS to the point that the release system will not pass the closure times required by pool operating standards and regulations (i.e., the discharge check valves can slow the response time of the SVRS). For example, a typical body entrapment event causes a vacuum level on the suction side of the system to increase very quickly. That vacuum can transfer into the pressure side of the system (i.e., the discharge side) and, when the system is equipped with discharge check valves, that vacuum can increase the sealing force on the discharge check valves and delay the SVRS from recognizing the presence of the body entrapment event and shutting down the pump to relieve the vacuum.

In some embodiments, as shown in FIGS. 1 and 3-7C, the hydraulic system 10 can include a discharge vacuum relief valve 76. The discharge vacuum relief valve 76 can allow the SVRS to function normally despite use of the discharge check valves 52 in the hydraulic system 10. The discharge vacuum relief valve 76 can be a vacuum sensing valve (e.g., a spring-loaded check valve) positioned on the discharge side of the hydraulic system 10. When the discharge vacuum relief valve 76 recognizes a vacuum level, it can open (i.e., provide a vent) in order to let air into the discharge side of the main pump 16, preventing the vacuum from transferring over to the discharge side and delaying detection by the SVRS of the main pump 16. As a result, the SVRS can react undisturbed by the presence of the discharge check valves 52 in the hydraulic system 10.

Figure 3:
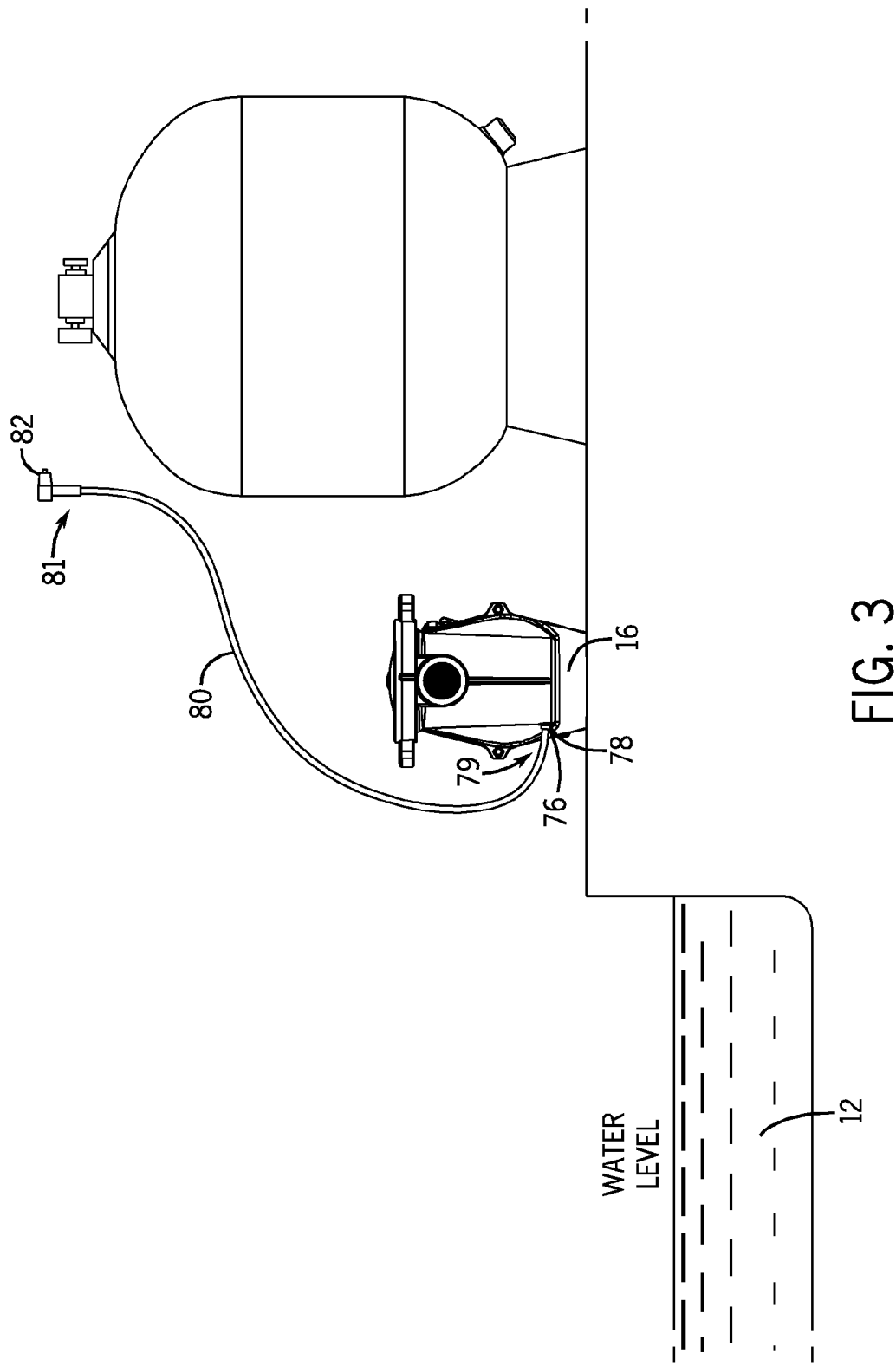
FIG. 3 is a schematic view of a discharge vacuum relief valve kit coupled to a SVRS pump according to one embodiment of the invention.
Figure 4:
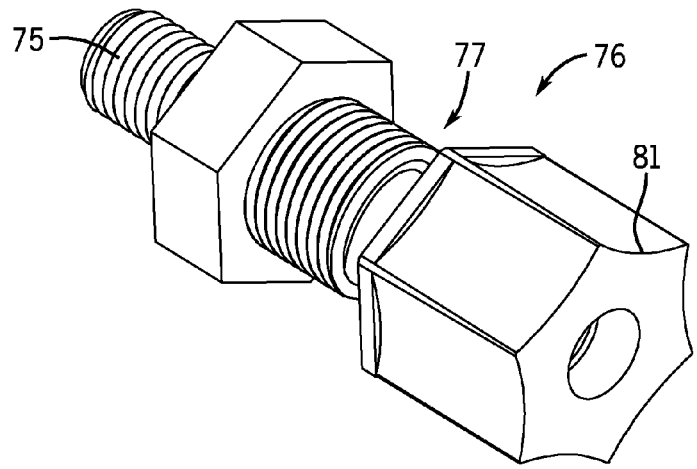
FIG. 4 is a perspective view of a discharge vacuum relief valve according to one embodiment of the invention.
Figure 5:
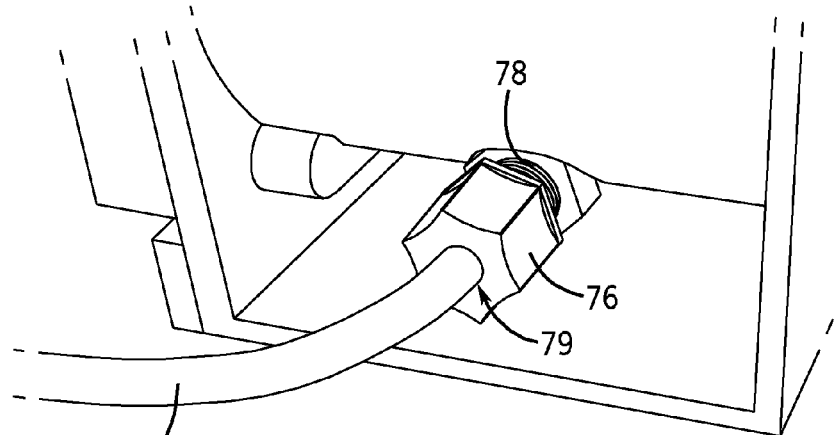
FIG. 5 is a partial perspective view of the discharge vacuum relief valve of FIG. 4 coupled to a SVRS pump.
Figure 6:
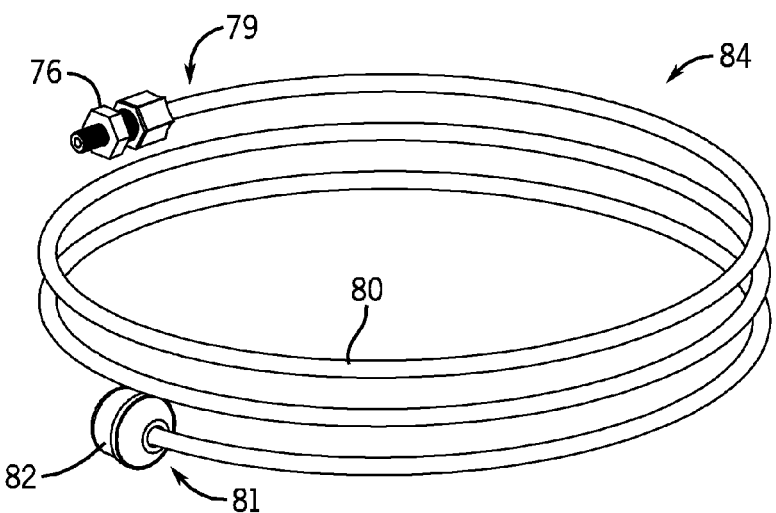
FIG. 6 is a discharge vacuum relief valve kit according to one embodiment of the invention.

In some embodiments as shown in FIGS. 3 and 5, the discharge vacuum relief valve 76 can be coupled to a drain plug opening 78 of the main pump 16 (e.g., by removing one of the drain plugs 63). The drain plug opening 78 and the discharge vacuum relief valve 76 can be coupled together via threading on the drain plug opening 78 and threading 75 (as shown in FIGS. 4 and 7B) on the discharge vacuum relief valve 76. As shown in FIGS. 3, 5, and 6, a vacuum vent tube 80 can be coupled to an end 77 of the discharge vacuum relief valve 76 by a compression fit (e.g., with a compression fitting such as a collar 81, a metal ring, a sleeve, or another suitable fitting). The vacuum vent tube 80 can be routed upward from its first end 79 coupled to the discharge vacuum relief valve 76 so that its second, free end 81 is above all bodies of water connected to the main pump 16, as shown in FIG. 3, or at least so that its free end 81 is above a maximum water level in all bodies of water in the hydraulic system 10. In addition, a vacuum vent screen 82 can be coupled to the free end 81 of the vacuum vent tube 80 to protect the discharge vacuum relief valve 76 and the vacuum vent tube 80 from dirt, insects, and other contaminants that could interfere with operation of the discharge vacuum relief valve 76.

In some embodiments, as shown in FIG. 6, the discharge vacuum relief valve 76, the vacuum vent tube 80, and the vacuum vent screen 82 can be provided as a discharge vacuum relief kit 84 to be coupled to a SVRS pump 16 being installed in existing hydraulic systems 10 with discharge check valves 52. For example, in discharge vacuum relief kit 84 of FIG. 6, the vacuum vent tube 80 can be a ⅜-inch thick tube, the vacuum relief valve can include the dimensions shown in FIGS. 7A and 7C, and the vacuum vent screen 82 can include the dimensions shown in FIGS. 8B and 8C. In one embodiment, the vacuum vent screen 82 can include a polyvinyl chloride (PVC) base 86 and a stainless steel mesh screen 88.

In some embodiments, characteristics of the discharge vacuum relief valve 76, such as allowed air flow (e.g., in cubic feet per minute) and pressure rating (e.g., in pounds per square inch) can be selected based on the type of swimming pool and/or spa application or, more generally, on the types of bodies of water in the hydraulic system 10. In one embodiment, the discharge vacuum relief valve 76 can have a pressure vent rating of about 1.5 pounds per square inch.

Figure 9A:
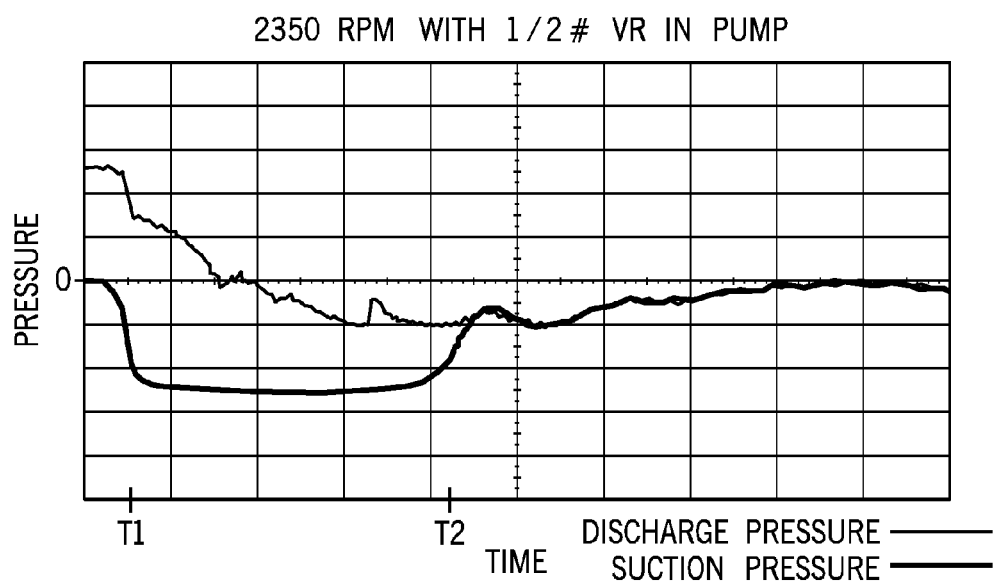
FIGS. 9A and 9B are graphs illustrating time and pressure measurements of a SVRS pump with a discharge vacuum relief valve, in accordance with one embodiment of the invention, and a pump without a discharge vacuum relief valve, respectively.
Figure 9B:
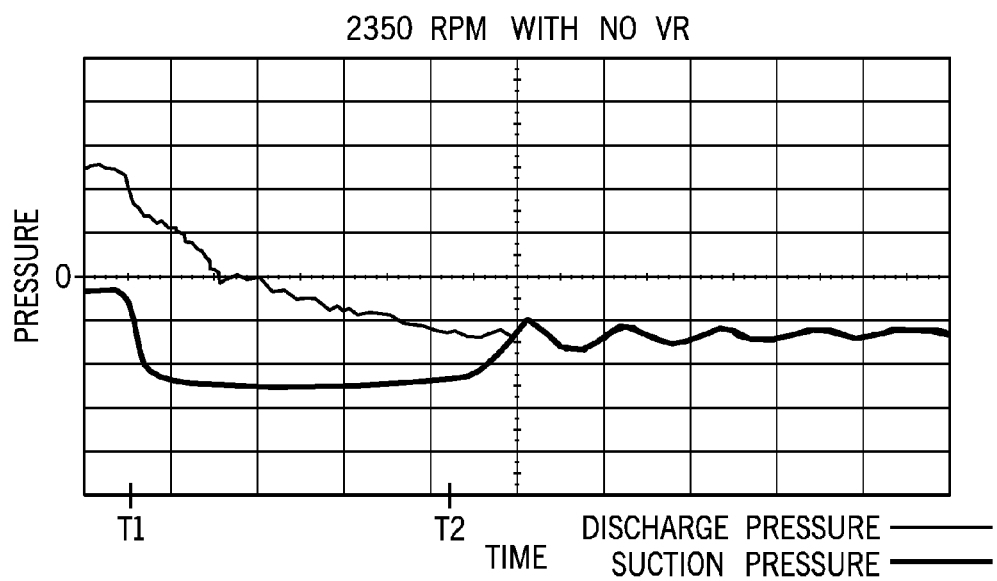

FIGS. 9A and 9B illustrate discharge pressure and vacuum pressure measured in a SVRS pump 16 with a discharge vacuum relief valve 76 and a SVRS pump without a discharge vacuum relief valve, respectively. As shown in FIGS. 9A and 9B, a vacuum event occurs at time T1, causing both the suction pressure and the discharge pressure to drop. As shown in FIG. 9A, the discharge vacuum relief valve 76 is triggered (i.e., around time T2), relieving the vacuum and causing both the discharge pressure and the suction pressure to ramp upward to about zero. As shown in FIG. 9B, without the presence of the discharge vacuum relieve valve 76, both the discharge pressure and the suction pressure continue to stay in a vacuum state (i.e., are maintained at negative pressures).

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method of providing discharge vacuum relief for a safety vacuum release system pump in a hydraulic system with discharge check valves, the method comprising:
   providing a discharge vacuum relief valve kit including a vacuum vent tube with a first end and a second end, a discharge vacuum relief valve coupled to the first end of the vacuum vent tube, and a vacuum vent screen coupled to the second end of the vacuum vent tube;
   coupling the discharge vacuum relief valve to a drain plug opening of the safety vacuum release system pump;
   monitoring input power to the safety vacuum release system pump to detect a vacuum event on a suction side of the safety vacuum release system pump;
   shutting down the safety vacuum release system pump when the vacuum event is detected on the suction side in order to relieve the vacuum event;
   monitoring pressure on a discharge side of the safety vacuum release system pump; and
   venting the discharge side of the safety vacuum release system pump when a vacuum is detected on the discharge side to prevent delayed response time in relieving the vacuum event on the suction side.

2. The method of claim 1 further comprising detecting a vacuum on the discharge side when the monitored pressure is about 1.5 pounds per square inch.

3. The method of claim 1 further comprising monitoring the pressure with the discharge vacuum relief valve and opening the discharge vacuum relief valve when the vacuum is detected in order to vent the discharge side.

4. The method of claim 1 further comprising positioning a free end of the vacuum vent tube above all bodies of water in the hydraulic system.

5. The method of claim 1, wherein the vacuum vent screen includes a polyvinyl chloride base and a stainless steel mesh screen.

6. The method of claim 1, wherein the step of monitoring at least input power to the safety vacuum release system pump to detect a vacuum event includes monitoring a change in input power.

7. A method of providing discharge vacuum relief for a safety vacuum release system pump in a hydraulic system with discharge check valves, the method comprising:
   providing a vacuum vent tube with a first end and a second, free end;
   coupling a discharge vacuum relief valve to the first end of the vacuum vent tube;
   routing the vacuum vent tube upward from its first end so that its second, free end is above a maximum water level in all bodies of water in the hydraulic system;
   coupling a vacuum vent screen to the second end of the vacuum vent tube; and
   venting the safety vacuum release system pump when a vacuum is detected.

8. The method of claim 7, wherein the discharge vacuum relief valve is coupled to the first end of the vacuum vent tube by a compression fit.

9. The method of claim 7, wherein the vacuum vent tube is routed upward from its first end so that its second end is above all bodies of water connected to the pump.

10. The method of claim 7 further comprising coupling the discharge vacuum relief valve to a drain plug opening of the safety vacuum release system pump.

11. The method of claim 7 further including the steps of monitoring input power to the safety vacuum release system pump to detect a vacuum event on a suction side of the safety vacuum release system pump, shutting down the safety vacuum release system pump when the vacuum event is detected on the suction side in order to relieve the vacuum event, monitoring pressure on a discharge side of the safety vacuum release system pump, and venting the discharge side of the safety vacuum release system pump when a vacuum is detected on the discharge side to prevent delayed response time in relieving the vacuum event on the suction side.

12. The method of claim 11, wherein the step of monitoring at least input power to the safety vacuum release system pump to detect a vacuum event includes monitoring a change in input power.

13. A method of providing discharge vacuum relief for a safety vacuum release system pump in a hydraulic system with discharge check valves, the method comprising:
   providing a vacuum vent tube with a first end, a second, free end, and a discharge vacuum relief valve coupled to the first end of the vacuum vent tube;
   routing the vacuum vent tube upward from its first end so that its second, free end is above a maximum water level in all bodies of water in the hydraulic system; and
   venting the safety vacuum release system pump when a vacuum is detected.

14. The method of claim 13, wherein the discharge vacuum relief valve is coupled to the first end of the vacuum vent tube by a compression fit.

15. The method of claim 13, wherein the vacuum vent tube is routed upward from its first end so that its second end is above all bodies of water connected to the pump.

16. The method of claim 13, further comprising the step of coupling the discharge vacuum relief valve to a drain plug opening of the safety vacuum release system pump.

17. The method of claim 13, further including the steps of monitoring input power to the safety vacuum release system pump to detect a vacuum event on a suction side of the safety vacuum release system pump, shutting down the safety vacuum release system pump when the vacuum event is detected on the suction side in order to relieve the vacuum event, monitoring pressure on a discharge side of the safety vacuum release system pump, and venting the discharge side of the safety vacuum release system pump when a vacuum is detected on the discharge side to prevent delayed response time in relieving the vacuum event on the suction side.

18. The method of claim 17, wherein the step of monitoring at least input power to the safety vacuum release system pump to detect a vacuum event includes monitoring a change in input power.

* * * * *